United States Patent [19]

Attanasio et al.

[11] Patent Number: 5,371,852
[45] Date of Patent: Dec. 6, 1994

[54] METHOD AND APPARATUS FOR MAKING A CLUSTER OF COMPUTERS APPEAR AS A SINGLE HOST ON A NETWORK

[75] Inventors: Clement R. Attanasio, Peekskill; Stephen E. Smith, Mahopac, both of N.Y.

[73] Assignee: International Business Machines Corporation, Armonk, N.Y.

[21] Appl. No.: 960,742

[22] Filed: Oct. 14, 1992

[51] Int. Cl.$^5$ ............................................. G06F 13/00
[52] U.S. Cl. .................................. 395/200; 370/85.13
[58] Field of Search .................. 395/200, 500; 370/60, 370/92, 93, 94.1, 54, 85.13, 85.1, 85.6, 85.8, 60.1, 110.1, 85.11, 95.1; 364/284.4, 242.94, 284.3, 284

[56] References Cited

U.S. PATENT DOCUMENTS

| | | | |
|---|---|---|---|
| 4,276,643 | 6/1981 | Laprie et al. | 371/8 |
| 4,667,287 | 5/1987 | Allen et al. | 364/200 |
| 4,719,621 | 1/1988 | May | 370/85 |
| 4,958,273 | 9/1990 | Anderson et al. | 364/200 |
| 5,023,780 | 6/1991 | Brearley | 364/200 |
| 5,079,765 | 1/1992 | Nakamura | 370/85.13 |
| 5,088,032 | 2/1992 | Bosack | 395/200 |
| 5,093,920 | 3/1992 | Agrawal et al. | 395/800 |
| 5,109,515 | 4/1992 | Laggis et al. | 395/725 |
| 5,125,081 | 6/1992 | Chiba | 395/325 |
| 5,166,931 | 11/1992 | Riddle | 370/94.1 |
| 5,185,860 | 2/1993 | Wu | 395/200 |
| 5,224,205 | 6/1993 | Dinkin et al. | 395/200 |

FOREIGN PATENT DOCUMENTS

| | | |
|---|---|---|
| 1002342 | 1/1991 | Belgium . |
| 59-117842 | 7/1984 | Japan . |
| 63-193739 | 8/1988 | Japan . |

OTHER PUBLICATIONS

D. E. Comer, "Internetworking with TCP/IP, Principles, Protocols and Architecture", Prentice Hall, US, Chapter 7, pp. 91–97; Chapter 11, pp. 159–169; and Chapter 12, pp. 171–203.

"Network Services", Network Programming, Sun Microsystems, Inc., 2550 Garcia Ave., Mountain View, Calif., Chapter 1, pp. 3–30, May 1988.

OSF DCE Release 1.0 S3, DCE Release Notes, Open Software Foundation, 11 Cambridge Center, Cambridge, Mass., Mar. 25, 1991, pp. i–v, 1–1 thru B–2.

J. K. Ousterhout et al., "The Sprite Network Operating System", IEEE Computer, Feb. 1988, US, pp. 23–36.

D. R. Cheriton, "The V Distributed System", Communication of the ACM, Mar. 1988, vol. 31, No. 3, pp. 314–333.

A. Bhide et al., "A Highly Available Network File Server", USENIX Conference, Winter 1991, Dalas, Tex., p. 199.

S. J. Mullender et al., "Amoeba A distributed Operating System for the 1990s", IEEE Computer, May 1990, US, pp. 44–53.

L. Peterson et al., "The X-kernel: A Platform for Accessing Internet Resources", IEEE Computer, May 1990, US, pp. 23–33.

A. Litman, "The DUNIX Distributed Operating System", Operating Systems Review, ACM Press, NY, vol. 22, No. 1, Jan. 1988, pp. 42–51.

*Primary Examiner*—Dale M. Shaw
*Assistant Examiner*—Moustafa M. Meky
*Attorney, Agent, or Firm*—Louis J. Percello

[57] ABSTRACT

The present invention provides a method and apparatus for enabling a cluster of computers to appear as a single computer to host computers outside the cluster. A host computer communicates only with a gateway to access destination nodes and processes within the cluster. The gateway has at least one message switch which processes incoming and outgoing port type messages crossing the cluster boundary. This processing comprises examining certain information on the message headers and then changing some of this header information either to route an incoming message to the proper computer node, port and process or to make an outgoing message appear as if originated at the gateway node. The message switch uses a table to match incoming messages to a particular routing function which can be run to perform the changes necessary to correctly route different kinds of messages.

35 Claims, 13 Drawing Sheets

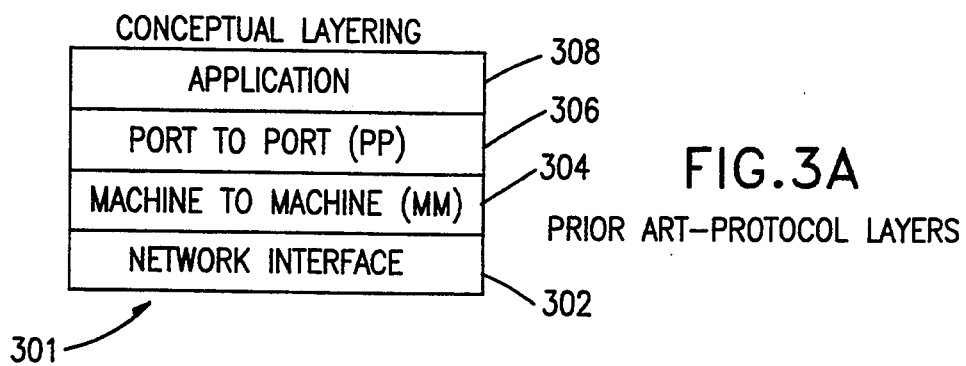
FIG.3A PRIOR ART—PROTOCOL LAYERS
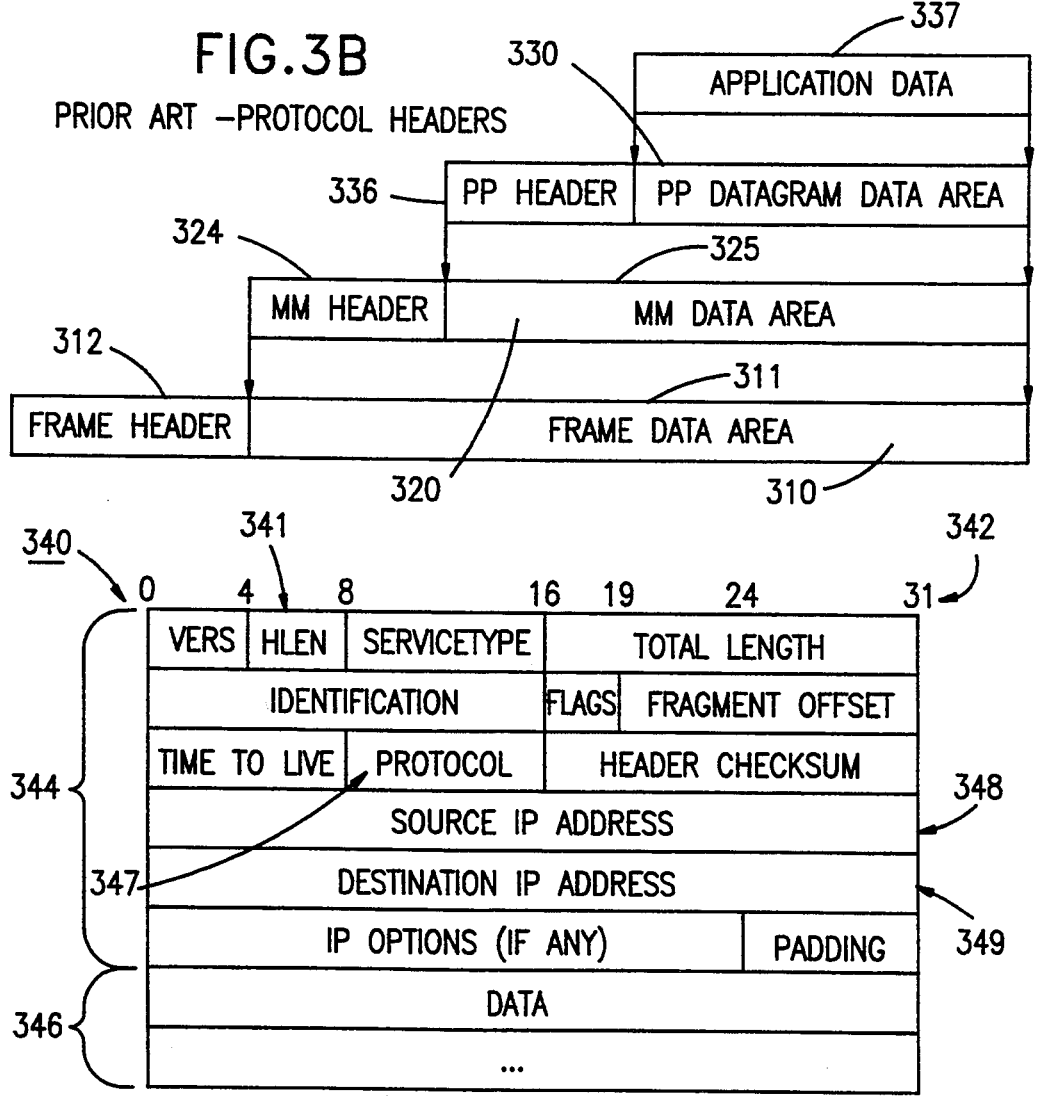
FIG.3B PRIOR ART—PROTOCOL HEADERS
FIG.3C PRIOR ART—INTERNET PROTOCOL (IP) HEADER

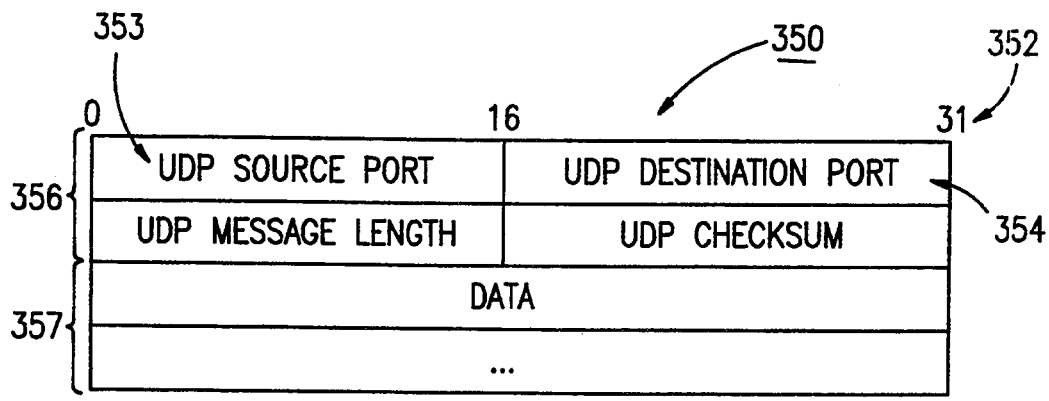
FIG.3D PRIOR ART—UDP DATAGRAM
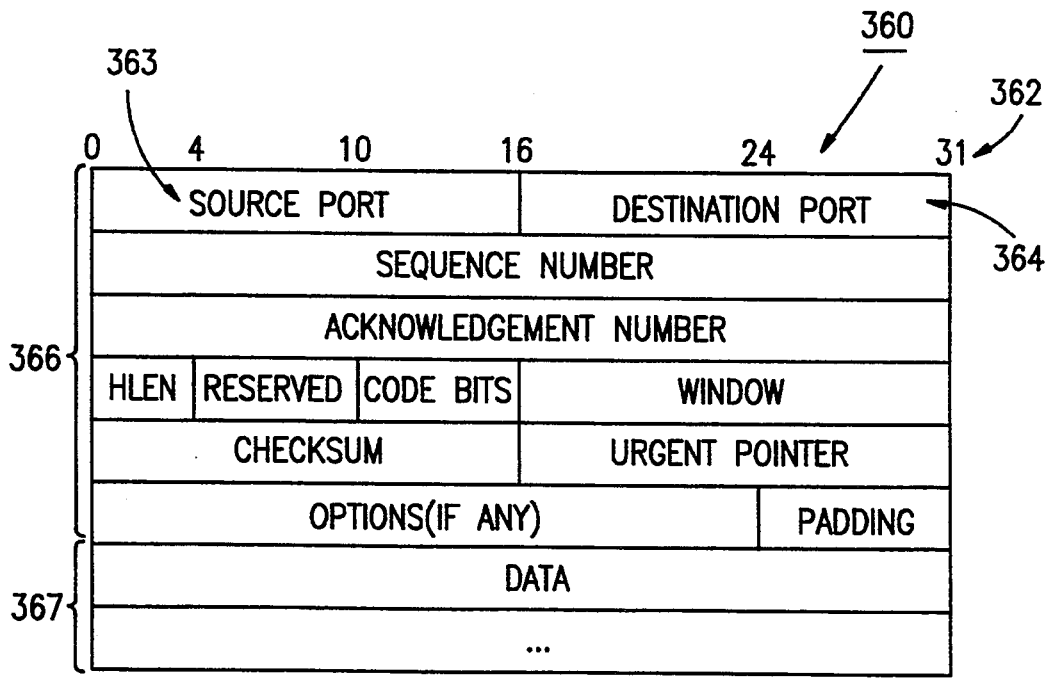
FIG.3E PRIOR ART—TCP DATAGRAM

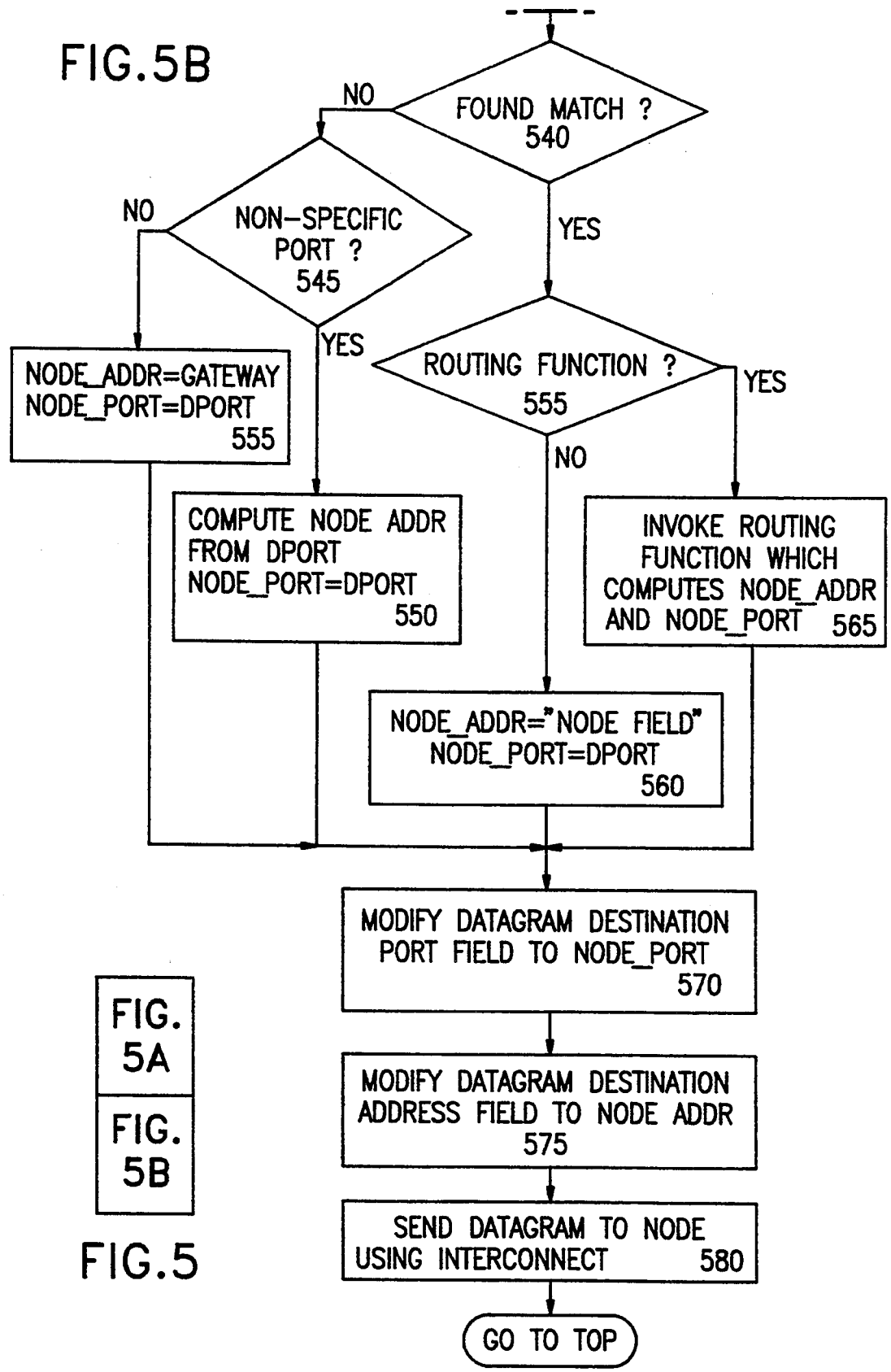

METHOD AND APPARATUS FOR MAKING A CLUSTER OF COMPUTERS APPEAR AS A SINGLE HOST ON A NETWORK

BACKGROUND OF THE INVENTION

1. Field of the Invention

This invention relates to the field of clustering computers. More specifically, the invention relates to a computer cluster which appears to be a single host computer when viewed from outside the cluster, e.g. from a network of computers.

2. Description of the Prior Art

The prior art discloses many ways of increasing computing power. Two ways are improving hardware performance and building tightly coupled multiprocessor systems. Hardware technology improvements have provided an approximately 100% increase in computing power every two years. Tightly coupled systems, i.e., systems with multiple processors that all use a single real main storage and input/output configuration, increase computing power by making several processors available for computation.

However, there are limits to these two approaches. Future increases in hardware performance may not be as dramatic as in the past. Tightly-coupled multiprocessor versions of modern, pipelined and cached processors are difficult to design and implement, particularly as the number of processors in the system increases. Sometimes a new operating system has to be provided to make the tightly-coupled systems operate. In addition, overhead costs of multi-processor systems often reduce the performance of these systems as compared to that of a uniprocessor system.

An alternative way of increasing computer power uses loosely-coupled uniprocessor systems. Loosely-coupled systems typically are independent and complete systems which communicate with one another in some way. Often the loosely-coupled systems are linked together on a network, within a cluster, and/or within a cluster which is on a network. In loosely coupled systems in a cluster, at least one of the systems is connected to the network and performs communication functions between the cluster and the network.

In the prior art and also shown in FIG. 1A, clusters 100 comprise two or more computers (also called nodes or computer nodes 105 through 109) connected together by a communication means 110 in order to exchange information. Nodes (105 through 109) may share common resources and cooperate in doing work. The communication means 110 connecting the computers in the cluster together can be any type of high speed communication link known in the art, including: 1. a network link like a token ring, ethernet, or fiber optic connection or 2. a computer bus like a memory or system bus. A cluster, for our purposes, also includes two or more computers connected together on a network 120.

Often, clusters of computers 100 can be connected by various known communications links 120, i.e., networks, to other computers or clusters. The point at which the cluster is connected to the outside network is called a boundary or cluster boundary 125. The connection 127 at the boundary is bi-directional, i.e., there are incoming and outgoing messages at the boundary. Information which originates from a computer (also called a host or host computer) 130 that is on the network 120 outside the cluster, which then crosses the boundary 127, and which finally enters the cluster 100 destined for one node (called a destination node) within the cluster 100, is called an incoming message. Likewise, a message which originates from a node (called a source node) within the cluster 100 and crosses the boundary 125 destined for a host 130 on the network outside the cluster is called an outgoing message. A message from a source node within the cluster 100 to a destination also within the cluster 100 is called an internal message.

The prior art includes clusters 100 which connect to a network 120 through one of the computer nodes in the cluster. This computer, which connects the cluster to the network at the boundary 125, is called a gatewaY 109. In loosely-coupled systems, gateways 109 process the incoming and outgoing messages. A gateway 109 directs or routes messages to (or from) the correct node in the cluster. Internal messages do not interact with the gateway as such.

FIG. 1B shows a prior art cluster 100, as shown in FIG. 1A, with the gateway 109 connected to a plurality (of number q) of networks 120. In this configuration, each network 120 has a connection 127 to the gateway 109. A cluster boundary 125 is therefore created where the gateway 109 connects to each network 120.

FIG. 1C goes on to show another embodiment of the prior art. In this embodiment, the cluster 100 has more than one computer node (105 through 109) performing the function of a gateway 109. The plurality of gateways 109, designated as G1 through Gp each connect to one or more networks 120. In FIG. 1C, gateway G1 connects to a number r of networks 120, gateway G2 connects to a number q of networks 120, and gateway Gp connects to a number s of networks 120. Using this configuration, the prior art nodes within the cluster 100 are able to communicate with a large number of hosts 130 on a large number of different networks 120.

All the prior art known to the inventors uses gateways 109 to enable external hosts to individually communicate with each node (105 through 109) in the cluster 100. In other words, the hosts 130 external to the cluster 100 on the network 120 have to provide information about any node (105 through 109) within the cluster 100 before communication can begin with that node. The hosts 120 external to the cluster also have to provide information about the function running on the node which will be accessed or used during the communication. Since communication with each node (105 through 109) must be done individually between any external host 130 and any node within the cluster 100, the cluster 100 appears as multiple, individual computer nodes to hosts outside the cluster. These prior art clusters do not have an image of a single computer when accessed by outside hosts. Examples of prior art which lacks this single computer image follow.

DUNIX is a restructured UNIX kernel which makes the several computer nodes within a cluster appear as a single machine to other nodes within the cluster. System calls entered by nodes inside the cluster enter an "upper kernel" which runs on each node. At this level there is an explicit call to the "switch" component, functionally a conventional Remote Procedure Call (RPC), which routes the message (on the basis of the referred to object) to the proper node. The RPC calls a program which is compiled and run. The RPC is used to set up the communication links necessary to communicate with a second node in the cluster. A "lower kernel"

running on the second node then processes the message. DUNIX is essentially a method for making computers within the cluster compatible; there is no facility for making the cluster appear as a single computer image from outside the cluster.

Amoeba is another system which provides single computer imaging of the multiple nodes within the cluster only if viewed from within the cluster. To accomplish this, Amoeba runs an entirely new base operating system which has to identify and establish communication links with every node within the cluster. Amoeba cannot provide a single computer image of the cluster to a host computer outside the cluster. Amoeba also has to provide an emulator to communicate with nodes running UNIX operating systems.

Sprite is a system which works in an explicitly distributed environment, i.e., the operating system is aware of every node in the cluster. Sprite provides mechanisms for process migration, i.e., moving a partially completed program from one node to another. To do this, Sprite has to execute RPCs each time a new node is accessed. There is no single computer image of the cluster presented to the network hosts outside these systems.

V is a distributed operating system which is able to communicate only with nodes (and other clusters) which are also running V. UNIX does not run on V.

Other techniques for managing distributed system clusters, include LOCUS, TCF, and DCE. These systems require that the operating system know of and establish communication with each individual node in a cluster before files or processes can be accessed. However, once the nodes in the cluster are communicating, processes or files can be accessed from any connected node in a transparent way. Thus, the file or process is accessed as if there were only one computer. These systems provide a single system image only for the file name space and process name space in these systems. In these systems, files and processes can not be accessed by host computers outside the cluster unless the host has established communication with a specific node within the cluster which contains the files and/or processes.

3. Statement of Problems with the Prior Art

Prior art computer clusters fail to appear as one entity to any system on the network communicating with them, i.e., the prior art does not offer the network outside its boundary a single computer image. Because of this, i.e., because computers outside the boundary of the cluster (meaning outside the boundary 125 of any gateway 109 of the cluster 100) have to communicate individually with each computer within the cluster, communications with the cluster can be complicated. For example, computers outside the boundary of the cluster (hosts) have to know the location of and processes running on each computer within the cluster with which they are communicating. The host computers need to have the proper communication protocols and access authorization for each node within the cluster in order to establish communication. If a node within the cluster changes its location, adds or deletes a program, changes communication protocol, or changes access authorization, every host computer external to the cluster for which the change is relevant has to be informed and modified in order reestablish communication with the altered node within the cluster.

The prior art lack of a single computer image to outside host computers also limits cluster modification and reliability. If hosts try to communicate with a node within the cluster which has been removed, is being maintained, or has failed, the communication will fail. If a new node(s) is added to the cluster, i.e., the cluster is horizontally expanded, the new node will be unavailable to communicate with other host computers outside the cluster without adding the proper access codes, protocols, and other required information to the outside hosts.

Accordingly, there has been a long felt need for a cluster of computers which presents a single computer image, i.e., looks like a single computer, to computers external to the cluster (gateway) boundary. A single computer image cluster would have the capability of adding or deleting computers within the cluster; changing and/or moving processes, operating systems, and data among computers within the cluster; changing the configuration of cluster resources; redistributing tasks among the computer within the cluster; and redirecting communications from a failed cluster node to an operating node, without having to modify or notify any computer outside the cluster. Further, computers outside the cluster, would be able to access information or run processes within the cluster without changing the environment where they are operating.

Systems like DUNIX, Amoeba, Sprite, and V provide some degree of a single system image from within the cluster (i.e., within the gateway boundaries 125) by writing new kernels (in the case of Amoeba, a totally new operating system.) This requires extensive system design effort. In addition, all the nodes of the cluster must run the system's modified kernel and communicate with servers inside the system using new software and protocols.

LOCUS, TCF and DCE provide single system images only for computers which are part of their clusters and only with respect to file name spaces and process name spaces. In other aspects, the identities of the individual nodes are visible.

OBJECTIVES

An objective of this invention is an improved method and apparatus for routing messages across the boundary of a cluster of computers to make the cluster of computers on a network appear as a single computer image to host computers on the network outside the cluster.

Also an objective of this invention is an improved method and apparatus for routing messages across the boundary of a cluster of computers to enable outside host computers on a network to use the same software and network protocols to access functions and information within the computer cluster as they would use to access those functions and information on a single remote host.

Also an objective of this invention is an improved method and apparatus for routing messages across the boundary of a cluster of computers so that computer nodes within the cluster can communicate with outside hosts on networks such that, from the viewpoint of the outside host, the communication is with a single remote host, i.e., the cluster, rather than with the individual cluster nodes.

A further objective of this invention is an improved method and apparatus for routing messages across the boundary of a cluster of computers so that work requests from outside the cluster can be evenly distributed among the computer nodes in the cluster.

SUMMARY OF THE INVENTION

This invention, called an encapsulated cluster, is a method and apparatus for routing information that crosses the boundary of a computer cluster. The information is in the form of port type messages. Both incoming and outgoing messages are routed so that the cluster appears as a single computer image to the external host. The encapsulated cluster appears as a single host to hosts on the network which are outside the cluster.

The apparatus comprises two or more computer nodes connected together by a communication link, called an interconnect, to form a cluster. (Note that in one embodiment of the invention, the interconnect can be a network.) One of the computers in the cluster, serving as a gateway, is connected to one or more external computers and/or clusters (hosts) through another communication link called a network. A gateway can be connected to more than one network and more than one node in the cluster can be a gateway. Each gateway connection to a network, i.e., boundary, has an address on the network. Each gateway has a message switch which routes incoming and outgoing messages by changing information on the message header based on running a specific routing function that is selected using port and protocol information in port type messages.

Since all incoming messages are addressed to the gateway, the cluster appears as a single computer to hosts outside the cluster that are sending incoming messages to nodes within the cluster. When processing incoming messages, the gateway first reads a protocol field in the message header and analyzes the message to determine if it is a port type message originating from a location outside the cluster. If the message is of port type, the location of the port number on the message is found. This port number and protocol type is used to search for a match to a port specific routing function in a table residing in memory within the message switch. If a table entry is matched, a routing function associated with the entry is selected and run. The routing function routes the message to the proper computer node within the cluster by altering information on the incoming message so that the message is addressed to the proper node within the cluster.

For outgoing messages, originating from a source node within the cluster, the message switch first recognizes that the message is a port type message that will cross the cluster boundary. The message switch then alters the message so that the source address is the gateway address rather than the address of the source node. In this way, computers external to the cluster perceive the message as coming from the gateway computer on the network rather than the sending node within the cluster.

BRIEF DESCRIPTION OF THE DRAWINGS

FIGS. 3a–3e shows the general structure of an incoming and outgoing message and a more specific message structure using the internet communication protocol.

DETAILED DESCRIPTION OF THE INVENTION

Figure 2:
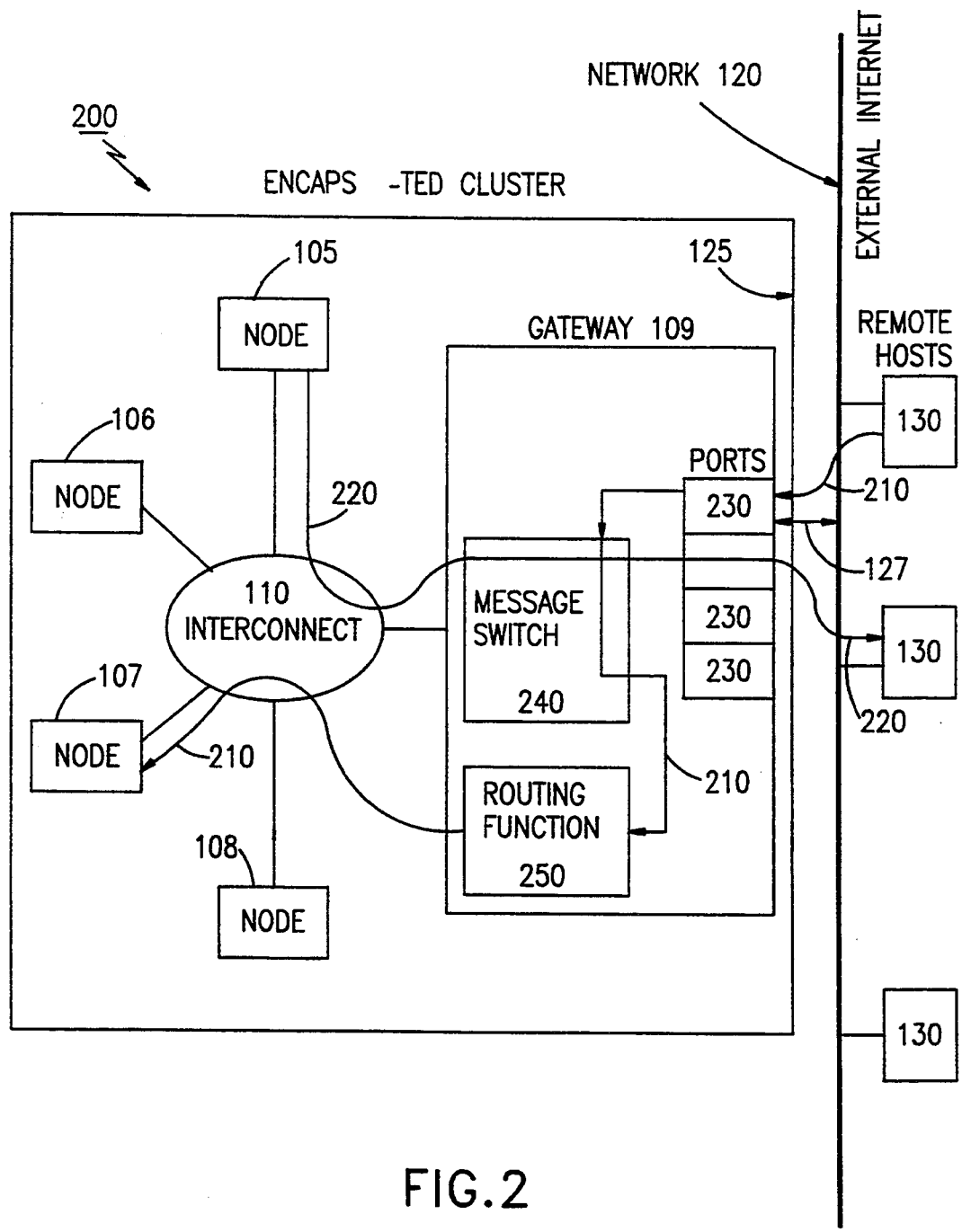
FIG. 2 shows an embodiment of the present invention.

FIG. 2 shows one embodiment of an encapsulated cluster 200, the present invention. The cluster comprises a plurality of computer nodes (105 through 109) one of which is a gateway 109. The nodes are connected together by a high speed interconnect 110, e.g., a network or any other link that is commonly used in the art. The gateway is connected with a bidirectional communication link 127 to a network 120. A boundary 125 is defined at the connection point between the network 120 and the gateway 109. Computers, called hosts 130, connect to the network 120 and can communicate with nodes within the cluster by passing messages through the gateway 109. An incoming message 210 is shown as being sent from a host 130, passing through the cluster boundary 125, a gateway port 230, a gateway message switch 240, a gateway routing function 250, the interconnect 110, and ultimately to the destination, the destination node 107 in the cluster 200. In a similar manner, an outgoing message 220, is shown originating at a source node 105 within the cluster 200; passing through the interconnect 110, gateway message switch 240, gateway port 230, cluster boundary 125, and ultimately to the destination host 130.

Although FIG. 2 represents a single cluster 200 with a single gateway 109, it is readily appreciated that one skilled in the art given this disclosure could produce multiple embodiments using this invention. For example, the cluster 200 might have multiple gateways 109 each connected to one or more networks or single host computers. A single gateway 109 may also have a plurality of network connections each of which being capable of communicating with one or more external hosts or one or more external networks. All these embodiments are within the contemplation of the invention.

The encapsulated cluster 200 connects 127 to a high speed communication link 120, here called a network 120. Host computers 130, also connected to the network 120, communicate with the encapsulated cluster 200, and the nodes (105 through 109) within the cluster, over the network 120. The host computers 130 used in the invention include any general purpose computer or processor that can be connected together by the network 120 in any of the many ways known in the art. The preferred network 120 is token-ring or ethernet. However, this high speed communication link 120 might also include other connections known in the art like computer system buses. A host computer 130 could also be an encapsulated cluster of computers 200, i.e., the present invention, which gives the image of a single computer to the network 120.

Nodes (105 through 109) in the encapsulated cluster 200 can also comprise any general purpose computer or processor. An IBM RISC SYSTEM/6000 was the hardware used in the preferred embodiment and is described in the book SA23-2619, "IBM RISC SYSTEM/6000 Technology." (RISC SYSTEM/6000 is a trademark of the IBM corporation.) These nodes may be independent uniprocessors with their own memory and input/output devices. Nodes can also be conventional multiprocessors whose processors share memory and input/output resources.

Nodes (105 through 109) within the cluster are connected together by a high speed communications link called an interconnect 110. This interconnect includes any of the many known high speed methods of connecting general purpose computers or processors together. These interconnects include networks like ethernet, token rings and computer system buses like a multibus or micro Channel. (Micro Channel is a trademark of the IBM corporation.) The nodes (105 through 109) are connected to the interconnect 110 using any of the methods well known in the art. The preferred embodiment contemplated uses a fiber optic point-to-point switch as the interconnect with a bandwidth more than five times that of a token ring. A commercially available switch of this type suitable for this application is the DX Router made by Network Systems Corporation. Support software for the preferred interconnect provides a network interface between the nodes which allows the use of standard Internet Protocol (IP) communication. Internal IP addresses are assigned to the nodes of the cluster. This is a standard industry communication protocol and it allows the use of standard software communication packages.

One or more of the nodes in the cluster connects to one or more networks 120 and performs as a gateway 109. All incoming 210 and outgoing 220 messages pass through the gateway 109. The connection of the gateway 109 to the network 120 forms the boundary 125 between the encapsulated cluster 200 and the network 120. The gateway 109 also has a message switch 240 which performs operations on the incoming 210 and outgoing 220 messages. These operations enable the encapsulated cluster 200 to appear as a single computer to hosts 130 on the network 120 which are outside the cluster 200. Moreover, the gateway 109 has a plurality of routing functions 250 which operate on the incoming messages 210 in order to direct them to the correct node (105 through 109) in the cluster and to the correct communication port on that node. To reiterate, the gateway 109 may connect to one or more networks 120. An encapsulated cluster 200 may also have more than one gateway 109.

To help understand the environment of the present invention, refer now to FIG. 3 for a brief, tangential, illustrative explanation of prior art network communication protocols. Much more detail about this subject is presented in *Internetworking with TCP/IP, Principles, Protocols and Architecture*, Douglas E. Comer, Prentice Hall, which is herein incorporated by reference.

Networks of computers often comprise different kinds of communications links with different kinds of host computers connected to those links. In order for messages to be sent from one host on the link to another host on the link, rules, called protocols, are established to control the communication links, route messages, and access appropriate host computers on the link.

As shown in FIG. 3A, these protocols can be conceptually viewed as being layered, with each protocol layer making use of the services provided by the layer beneath it. The lowest layer, the Network Interface (302), deals at the hardware level, with the transmission of data between hosts on a single network of a particular type. Examples of network types are token-ring and ethernet. The Network Interface layer presents an interface to the layers above it which supports the transmission of data between two hosts on one physical network, without having to deal with the requirements of the specific network hardware being used.

The next higher layer, The Machine-to-Machine (MM) layer 304, provides the capability to communicate between hosts which are not directly connected to the same physical network. The MM layer establishes a naming system which assigns to each host computer a globally unique name (MM address). It presents an interface to the protocol layers above it which make it possible to send data to a remote host machine by simply specifying the unique MM-address of the destination host. Internet protocol (IP) is example.

The next higher protocol layer, the Port-to-Port (PP) layer 306, makes it possible for multiple processes (executing application programs) to communicate with processes at remote hosts, at the same time. The PP layer defines a set of communication ports on each host, and provides the ability to send data from a port on one machine (the source port) to a port on a remote machine (the destination port). The PP layer uses the MM protocol layer to transfer data between host machines. The PP layer presents an interface to the application layer 308 which allocates a local communication port to a process, connects that port to a remote port on a remote host, and transfers data between the local port and remote port. Examples include TCP and UDP protocols.

The application box 308 in FIG. 3A represents processes making use of the PP layer application interface in order to communicate with processes executing on remote hosts.

When an application process writes data to a communication port, the data passes down through the protocol layers on its machine, before being transferred over one or more physical networks to the destination machine. Each protocol layer prepends a protocol header to the data it is given. This is shown in FIG. 3B. The PP layer prepends a PP header 336 to the application data 337 to form a PP datagram. While different PP protocols will use headers containing different information, they will always contain the source port number and destination port number. The PP layer 306 passes to the MM layer 304 the PP datagram 330, the MM address of the destination machine, and a protocol identifier, which specifies which of the possible PP protocols is being used, (for example TCP, the value of 6, or UDP, the value of 17).

The MM layer treats the entire PP datagram 330 as data 325 and prepends to it an MM header 324 to form an MM datagram 320 or MM message 320. While the MM headers used by different MM protocols may vary, they will all contain three fields: The MM address of the sending machine (source address), the MM address of the destination machine (destination address), and the protocol identifier for the kind of PP protocol being used. The MM layer chooses an available network, and a machine on that network to send the MM packet to.

This may be the final destination machine, or an intermediate machine which will forward the MM datagram towards its final destination. The MM layer passes to the Network Interface 302 for the network to be used, the MM message, the MM address of the machine the packet is to be sent to, the identifier for the type of MM protocol that is being used.

The Network Interface 302 transmits "frames" to hosts attached to its network. It treats the entire MM message as frame data 311, and prepends to it a frame header 312 to form a frame 310. The size and format of the frame header will depend on the type of network hardware being used, e.g., token-ring frame headers will differ from ethernet frame headers. However, the frame headers must necessarily identify the most to receive the frame, and contain the identifier for the type of MM protocol being used. At this protocol level the destination host is identified by a network specific hardware address, and it is the responsibility of the Network Interface layer 302 to translate the MM address passed by the MM protocol layer to the network specific hardware address.

When a frame is accepted by the Network Interface layer 302 of the destination machine, it passes up through the protocol layers 301. Each protocol layer removes its protocol header, and passes the remaining data up to the protocol specified by the protocol identifier in its header. The PP protocol layer removes the PP header, and associates the application data with the destination port specified in the PP header. A process running on the destination machine can then access the received data by reading from that port.

FIG. 3C shows the configuration of information in a MM header 324 shown in FIG. 3B. This configuration 340 shows organization of a MM header and MM data area using Internet Protocol (IP), the MM protocol used by the preferred embodiment. The configuration 340 is shown as a sequence of 32 bit words. The first six words in the sequence are the IP header 344 (represented generally as the MM header 324 in FIG. 3B) and the remaining words 346 are the IP data area 346 (represented generally as the MM data area 325 in FIG. 3B). The numbers 342 across the top of the configuration 340 show the starting bit locations of the various fields in the words of the IP MM message. The IP fields of particular interest are the protocol 347, source IP address 348, and destination address 349 fields. Each machine using IP is assigned a globally unique IP address. The IP protocol field 347 gives information about the protocol used in the next highest layer of protocol. For instance, the protocol field 347 specifies if the next highest level will use UDP or TCP protocol. The source IP address 348 specifies the address of the computer which originated the message. The destination IP address 349 specifies the address of the computer which is to receive the message. Other fields in the IP header like total length and fragment offset are used to breakup network datagrams into packets at the source computer and reassemble them at the destination computer. The header checksum is a checksum over the fields of the header, computed and set at the source and recomputed for verification at the destination.

User Datagram Protocol (UDP) is one of two protocols used by the preferred embodiment. UDP transfers discrete packets of data, called datagrams, from a source port on one machine to a destination port on a remote machine. FIG. 3D shows the format of a UDP datagram 350 (represented generally as the PP datagram 330 in FIG. 3B). The UDP message is shown as a sequence of 32 bit words. The UDP message 350 comprises a UDP header 356, which use the first two words in the message, and a UDP data area 357, which use the remaining words in the message. The numbers 352 on top of the message 350 designate the starting location of the different fields in the UDP header 356. Since UDP is classified as a port type protocol, its header contains information about two ports, a UDP source port 353 and a UDP destination port 354. The UDP source port 353 is the port on the machine from which the message originated and the UDP destination port 354 is the port on the machine to which the message is sent.

From the viewpoint of the sending and receiving processes a UDP datagram is transferred as a unit, and can not be read by the receiving process until the entire datagram is available at the destination port. UDP uses IP to transfer a datagram to the destination machine. At the destination machine, the UDP protocol layer determines the eventual destination for the datagram using only the destination port number. This implies that within one machine, the UDP protocol layer must ensure that the UDP ports in use at any one time are unique.

Transmission Control Protocol (TCP) is the second PP protocol used in the preferred embodiment. With TCP a connection is established between TCP ports on two machines. Once the connection is established, data flows in either direction as a continuous stream of bytes. Data written on one end of a connection is accumulated by the TCP protocol layer. When appropriate, the accumulated data is sent, as a TCP datagram, to the remote machine using IP. At the remote machine, the TCP layer makes the data available to be read at the other end of the connection. Processes reading and writing data over a TCP connection do not see the boundaries between the TCP datagrams used by TCP to send data from one end of the connection to the other.

FIG. 3E shows the format of a TCP datagram. Again, the TCP format is shown as a sequence of 32 bits words, the first six words being the TCP header 366 (generically represented as 336 in FIG. 3B) and the remaining words being the TCP data 367 (generically represented as 337 in FIG. 3B). The numbers 362 across the top of the TCP format 360 represent the starting bit locations of the fields in the TCP header 366. The TCP header 366, being a port type protocol, has port information in its header 366 including a source port 363 and a destination port 364.

A TCP connection from a port on the source machine to a port on a destination machine is defined by four values: source address 348, source port number 363, destination address 340, and the destination port number 364 of the remote port on that machine. When the TCP protocol layer receives a TCP datagram, it uses all four values to determine which connection the data is for. Thus, on any one machine, TCP ensures that the set of active connections is unique. Note that this means TCP ports, unlike UDP ports, are not required to be unique. The same TCP port may be used in multiple connections, as long as those connections are unique.

Figure 4:
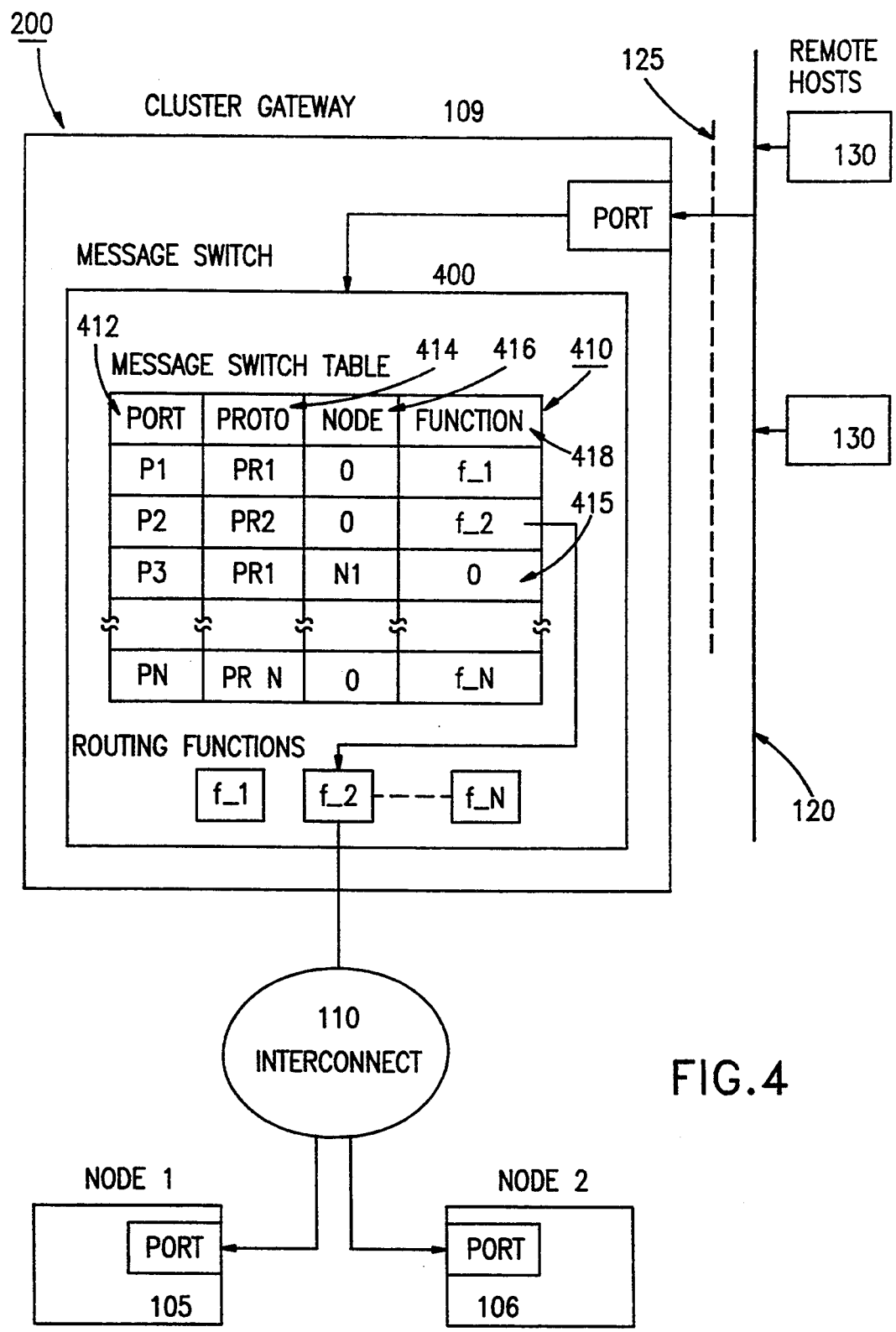
FIG. 4 shows a preferred embodiment of a message switch.

Returning now to the description of the present invention, refer to FIG. 4. FIG. 4 shows a cluster of computers 200, of the present invention, routing an incoming message. The cluster 200 has three nodes (105, 106, and 109) connected together by an interconnect 110. One of the nodes is a gateway 109 which connects to an external network 120 at a boundary 125. All messages arriving at the cluster 200, from the external network 120, arrive with the cluster gateway 109 external address as their destination IP address in their IP header. When the gateway 109 recognizes an incoming message crossing the boundary 125 it analyzes the IP header (this includes determining which protocol is designated in the protocol field). At this point, the PP datagram header is analyzed to determine the destination port of the message. The location of the destination port field will depend on the length of the IP header, and the type of PP protocol (UDP or TCP) being used. A message switch 400 in the gateway 109 uses the message protocol and the message destination port information to route the message to a node in the cluster for further processing. Note that every incoming message address only the gateway of the cluster. This gives the cluster the appearance of a single computer to the network, even though the incoming messages can be routed to any of the nodes in the cluster.

The message switch 400 comprises a message switch table 410 and the necessary software needed to route messages having a plurality of protocols and port numbers. Once the values of the destination port and protocol of the message are determined, the pair of values is looked up in the message switch table 410. (Column 412 represents values of destination ports and column 414 represents values of message protocols in the message switch table 410). For each pair of destination port and protocol values on an incoming message, there exists only one function designated f_1, f_2, ... f_N in column 418 of the message switch table 410. This selected function, which is typically a software program, is run to determine to which node, and to which communication port on that node, the incoming message will be sent. The destination IP address is changed to the internal address of the specified node, and if necessary, the destination port is changed to the specified port number. The modified IP message is then sent to the specified node via the Network Interface for the cluster interconnect.

Figure 5A:
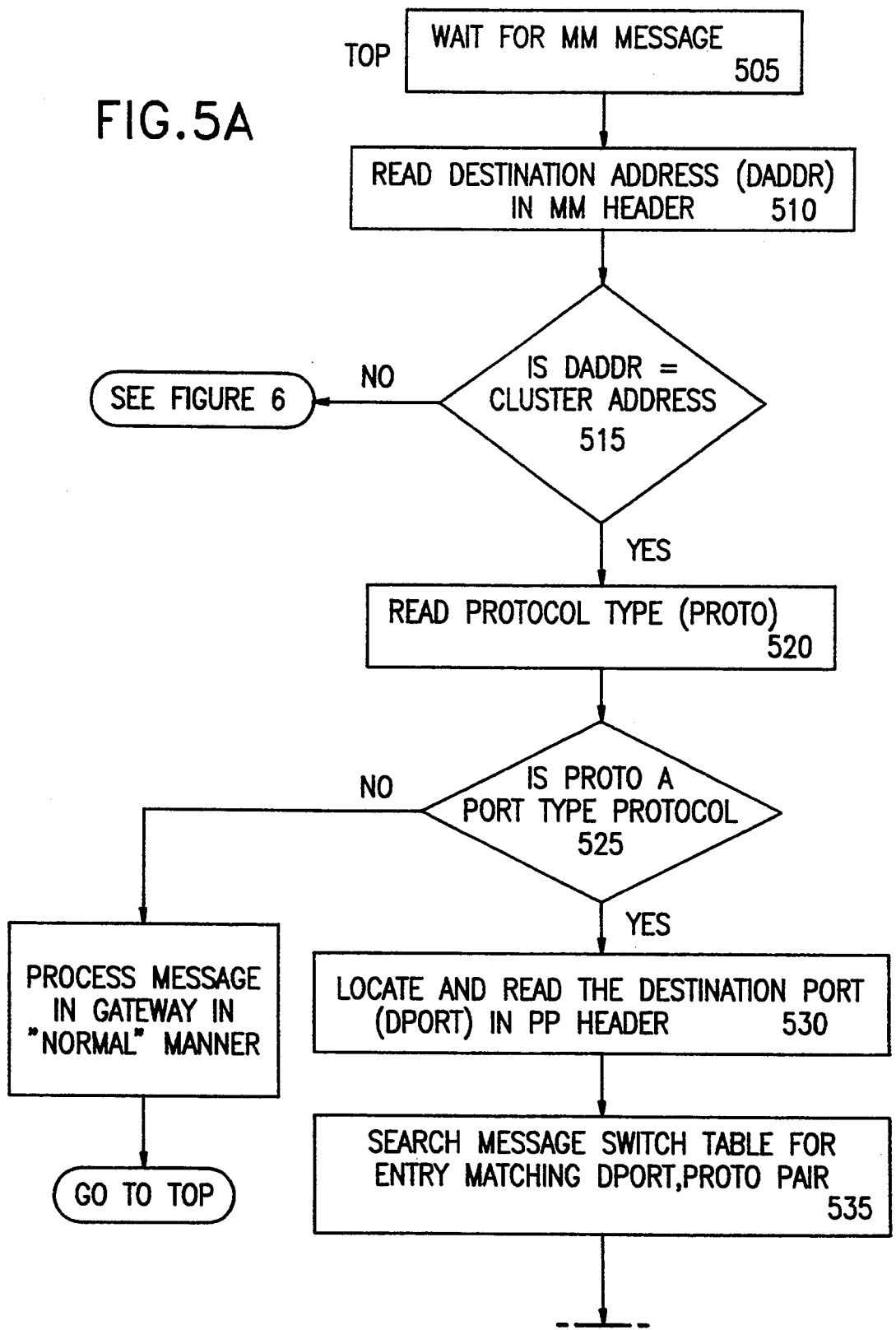
FIG. 5 is a flow chart showing the steps performed by the present invention to route an incoming message.

FIG. 5 is a flowchart description of how an incoming message is processed by the present invention.

Box 505 shows the cluster gateway waiting for a message. There are many well known ways for doing this. For example, circuitry or microcode is embodied on a device card in the gateway which connects to the network. If device card circuitry recognizes information on the frame header of packet on the network, the circuitry will store the packet in a buffer. At this point, some mechanism like an interrupt driven program in the operating system or a server will read the fields in the frame header and determine, among other things, if the packet contains a machine-to-machine (MM) protocol. If the packet contains a MM protocol, the frame header is stripped from the packet and the frame data area, i.e., the MM header and data area are processed further. This processing might include placing the MM header and data area in a queue and "waking up" a program to operate on this information.

In box 510, the destination address field in the MM header is read. Methods of reading this field are known in the art. Also, for a given MM protocol, the destination address field is a known location in the MM header. For example, in the preferred embodiment, IP is used and the destination address 349 field is positioned as the 5th 32 bit word in the IP header as shown in FIG. 3C. The destination address is designated as the value DADDR in FIG. 5.

Figure 6:
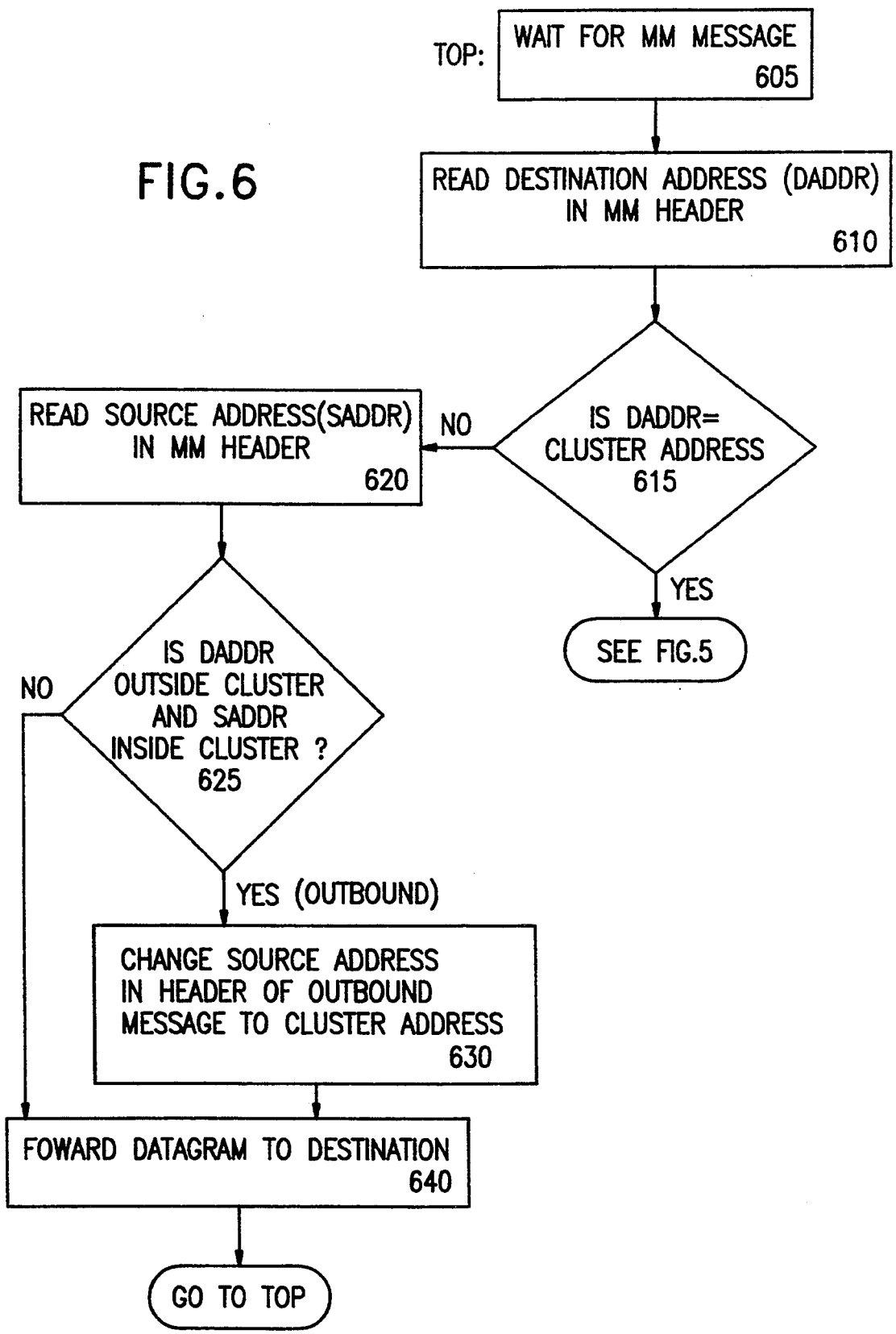
FIG. 6 is a flow chart showing the steps performed by the present invention to route an outgoing message.

Decision block 515 determines if the final destination of the MM information is in the cluster. This is done by comparing the destination address of the message with a list of all the cluster addresses supported by this gateway. There can be more than one cluster address when the gateway is attached to more than one network. In that case, there will be a different cluster address for each network to which the gateway is attached. The processing for the case when the comparison fails is shown in FIG. 6, and is described below. If the comparison determines that the destination address is an address in the cluster, the message is accepted for processing within the cluster. This entails an analysis of the MM header.

Box 520 begins analysis of the MM header by reading the protocol field in the MM header. In a given MM protocol, the protocol field is positioned in a pre-determined place in the header. For instance, the preferred embodiment uses IP which has its protocol field 347 starting at bit position 8 in the third 32 bit word of the header. (See FIG. 3C). The value of the protocol field in the MM header is designated as PROTO in FIG. 5.

In decision block 525 PROTO, the value of the protocol field in the MM header is compared to a list of known protocol values residing in a table or list in the gateway. If PROTO matches entries in the table which are port type protocols the process continues. If PROTO does not match entries which are port type protocols, the MM message is processed as it otherwise would be. (Note that a port type message uses protocols which require ports on both the source and destination computers in order to establish communications.)

Box 530 further analyzes the PP header by locating and reading the destination port number. This destination port, designated as DPORT in FIG. 5, is located in the PP datagram header (336 in FIG. 3B) and for TCP or UDP messages it starts at bit 16 of the first 32 bit word in the PP datagram header. (See FIGS. 3D and 3E.) However, because the MM header is still on the message, the starting position of the destination port in the datagram header may be at different locations depending upon the length of the MM header. As a result, the starting location of the destination port field has to be calculated relative to the first bit of the message. This is normally done using a header length value which is available in the MM header. In the IP case, the IP header length is field HLEN 341 which starts at the 4th bit of the 1st 32 bit word of the header. (See FIG. 3C).

In box 535, the message switch table (410 in FIG. 4) is searched for an entry which has a destination port value 412 and protocol value 414 pair equal to the respective DPORT and PROTO in the incoming message. Decision block 540 determines what action follows based on whether or not a matched pair was found.

In box 535, if the values of DPORT and PROTO do not match the port and protocol values in any entry in the message switch table, it may be possible for the message switch to compute to which node the inbound message should be sent using the value of DPORT. This is possible because of the way ports are allocated within the cluster. Processes frequently request a port to be allocated, but do not care about the particular port number of the allocated port; they let the PP protocol layer choose the number of the port which is allocated. We call such ports "non specific ports". The PP protocol layers on nodes of the cluster allocate non specific port numbers by an algorithm which makes it possible to compute the node address of the node a port was allocated on using only the number of the port. Given this disclosure, many such algorithms could be developed by one skilled in the art. Examples include: preallocating ranges of port numbers to the nodes, or allocating port numbers such that the number modulo the number of nodes in the cluster identifies the node.

Continuing with the flowchart of FIG. 5, if no entry is found in the message switch table which matches DPORT and PROTO (boxes 535 and 540), then decision block 545 determines if DPORT is a non specific port, i.e., one allocated by the algorithm described above. If DPORT is a non specific port, then in box 550, we compute the destination node, NODE_ADDR, from the value of DPORT. The destination port number is not changed, so NODE_PORT is set equal to DPORT.

If in box 545 it is found that DPORT is not a non specific port, then DPORT is a port unknown to the message switch. In such cases, box 545 takes the default action of having the inbound message processed by the gateway. To do this, NODE_ADDR is set to the internal node address of the gateway. The destination port is unchanged, so NODE_PORT is set to DPORT.

Decision block 555 determines how incoming messages are handled if there is a matched pair in the message switch table. The decision is based on whether or not there is a routing function (418 in FIG. 4) associated with the matched entry in the message switch table.

If there is no routing function 415 (the routing function is NULL) in the matched message switch table entry, the incoming message is processed as shown in box 560. In these cases, the new NODE_ADDR is set equal to the value in the node field (416 in FIG. 4) of the message switch table. The new NODE_PORT is again unchanged, i.e., it is set equal to DPORT. Incoming messages are processed in this way if there is only one node in the cluster which is assigned a particular port and protocol pair.

The last group of incoming messages are processed as shown in box 565. These messages have a matched pair entry in the message switch table which has a routing function designated in the table (418 in FIG. 4). These routing functions may access information which is in the MM header, PP header, and/or data fields and use this information to calculate the new destination address (NODE_ADDR) and port number (NODE_PORT). The same routing function may be used for different entries in the message switch table or the routing functions can be unique to each entry.

Message switch routing functions allow a port number and protocol pair to be used on more than one node. The need for this occurs when one wants to run an application/service which is associated with a specific well-known port number on more than one node. For example, rlogin always uses TCP port 513, and NFS always uses UDP port 2049. With the message switch, it is possible to run NFS at multiple nodes within the cluster, and have an NFS routing function, associated with UDP port 2049, to route NFS requests to the correct node. A routing function for NFS is described separately below.

Once the new NODE_PORT and NODE_ADDR values are calculated as described above, they are used to replace values in fields of the incoming message. In box 570, the destination port field (see FIG. 3D and 3E) in the PP header are changed (if necessary) to equal the value DPORT. In some protocols, other fields may have to be changed (e.g. header checksum) to maintain coherency in the header. In box 575, the destination address in the MM header is changed to equal the value of NODE_ADDR.

Figure 1A:
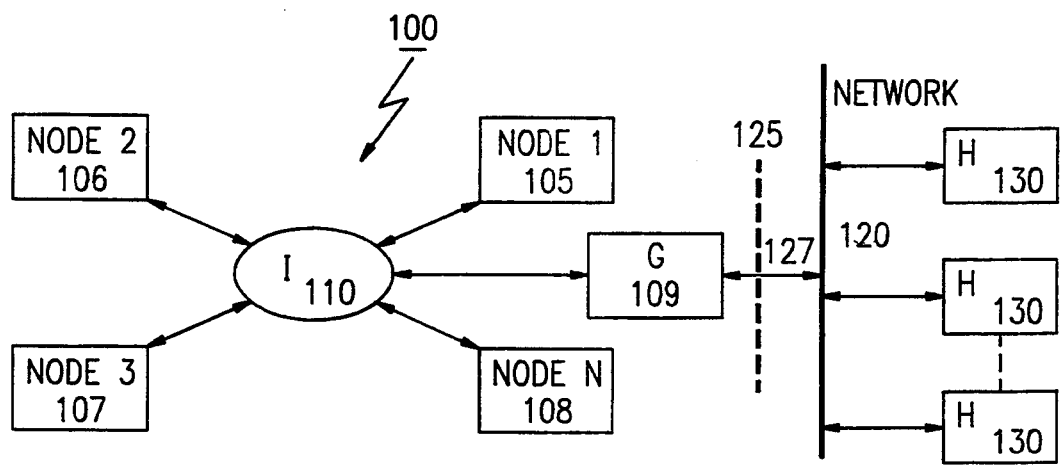
FIGS. 1A–1C show three embodiments of prior art computer clusters that are attached to external communication links like networks.
Figure 1B:
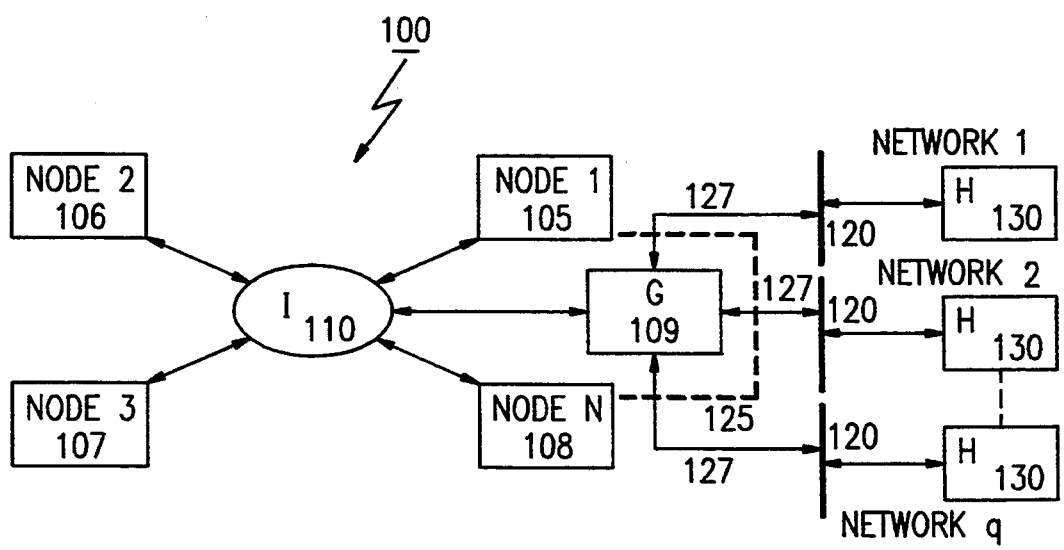
Figure 1C:
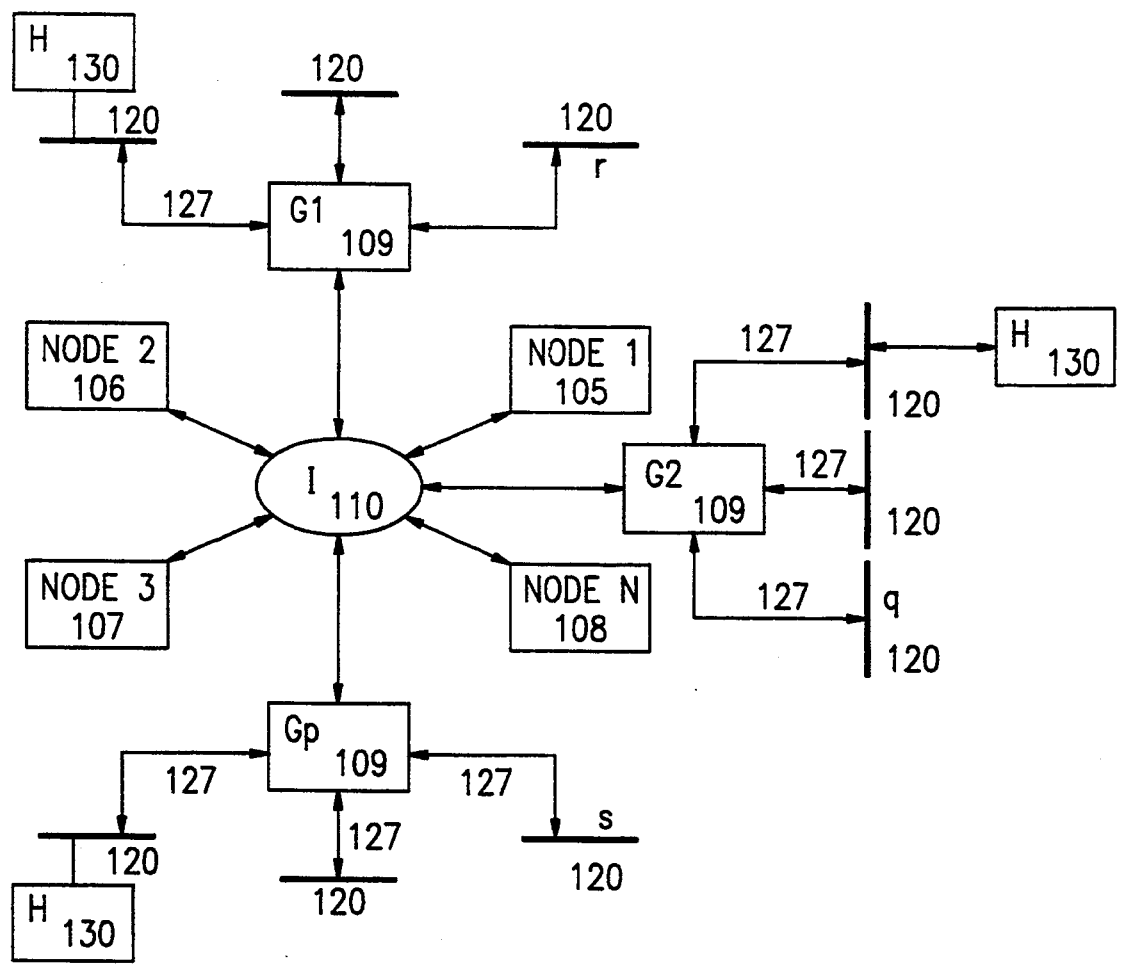

At this point, shown in box 580, the appropriate network protocols/headers are added to the incoming message for it to be transmitted on the interconnect. These protocols/headers are specific to the interconnect used and are well known. First, a check is made to see if the selected destination node is this gateway, by checking if NODE_ADDR is the internal address of this gateway. If it is, the inbound message is processed locally, by passing it up to the appropriate PP protocol layer in the gateway. Otherwise, the inbound message, with modified headers, is passed to the Network Interface for the cluster interconnect (110 in FIG. 1) to be sent to the selected destination node in the cluster.

FIG. 6 is a flowchart describing the processing in the gateway for MM messages which do not have a destination address equal to a valid external cluster address. We are particularly interested in the cluster processing performed for messages originating at a node in the cluster, and being sent to a machine outside the cluster. We call such messages "outbound" messages.

Box 605 shows the gateway waiting for a message. This is the identical function that is running in box 505 of FIG. 5. Note that the gateway initially does not know if the messages it receives originate from an outside host or a node within the cluster.

Box 610 is the same function as box 510 of FIG. 5. As before, the destination address (DADDR in FIG. 6) of the MM header is read. Again, for IP, the destination address resides as the 5th 32 bit word in the IP header. (See FIG. 3C).

Box 615 is the same function as box 515 in FIG. 5. It compares DADDR to a list of external cluster addresses supported by the gateway. FIG. 5 described the processing when DADDR is found in the list (the YES branch), i.e., when the message is an inbound message to the cluster. In FIG. 6 we detail the "NO" path out of box 615, for messages which arrive at the cluster gateway, but do not have a cluster address as their destination. These messages may originate from within the cluster or from outside the cluster.

In box 620 the source address (SADDR in FIG. 6) is read. For IP, the source address is found in the IP header as the 4th 32 bit word. (See FIG. 3C).

Box 625 determines if the message is an outgoing message. An outgoing message must have originated at a node within the cluster (SADDR is the address of a cluster node) and be destined for a host outside the cluster (DADDR is the address of a host outside the cluster). If either of these conditions is not satisfied, i.e., the message is not an outgoing message, the message is processed at the frame level in box 640.

However, if the message is an outgoing message type, it is processed in box 630 before going on the network. In box 630, the source address in the message header (SADDR) is changed to that of the address of the cluster. The cluster address for this purpose is the (or an) address of the gateway where the message will be placed on the network. By changing the source address in this way, hosts on the network external to the cluster will view the message as coming from the gateway and not the source node within the cluster. As a result, the source node will be invisible to the external host and the entire cluster will have the image of a single computer, whose address is the gateway connection address. At this point, the outgoing message is ready for frame level processing in box 640. Note that if the source port number of an incoming message was changed by the message switch when it entered the cluster, the message switch must change this source port number to one of the port numbers on the gateway when the message leaves the cluster. This insures that the cluster appears as a single image computer to hosts on the network.

Box 640 performs the frame level processing. This is done using any number of known methods in the art. Specifically, a standard subroutine is called which incorporates the MM message into a frame data area, adds a frame header to the frame data area, and places the newly created frame message on the network. The subroutine is designed specifically to support the type of network upon which the message is placed. For example, messages which return to nodes within the cluster (DADDR is a cluster node address) will be processed by a subroutine that supports the protocol used by the interconnect 110. Alternatively, messages which are placed on an outside network will be processed by a subroutine that supports that particular outside network.

An alternative preferred embodiment is now described. In this embodiment, all nodes have a list of all of the cluster addresses supported by the gateways. Any node in the cluster receiving a message compares the destination address of the message to the list of addresses. If the message is addressed to any cluster address in the list, or the nodes own internal address, the node receiving the message will process the message.

In this embodiment, the cluster gateways process inbound MM messages as described by the flowchart in FIG. 5, except that the destination address in the MM header is not replaced by NODE_ADDR (the internal address of the node to which the message is to be forwarded). Processing is as in FIG. 5, but with box 575 deleted. NODE_ADDR is still computed, and still used (box 580 of FIG. 5) to specify the node to which an inbound MM message is to be sent. Frame headers used by the Network Interface layer for the cluster interconnect still use the internal address of the destination node. In this alternate embodiment, forwarded MM messages arrive at the selected node with the destination address field in the MM header containing the external cluster address it had when it arrived at, and was accepted by, the cluster gateway. (When using IP as the MM protocol, this means that IP incoming messages arrive at the nodes with the destination IP address being the external IP address of the cluster, rather than the internal IP address of the receiving node.)

In this alternate preferred embodiment, the nodes perform additional cluster processing for outbound MM messages. A node detects when it is originating (is the source of) a MM message to a destination outside the cluster. Instead of using its own internal address, the node chooses an external cluster address, and places it in the source address field of the MM header. If the cluster has only one address, because it is attached to only one network at one gateway, then the node uses that address as the source address, and sends the message to that gateway for forwarding to the external destination. If the cluster is attached to multiple networks via multiple gateways, the cluster will have a different cluster address for each of these networks. Then, the nodes choose the cluster address associated with the network that provides the most direct path to the external host, and the nodes send the outbound MM message to the gateway attached to the selected network. One network is designated as a default, to be used when a node is not able to choose among the multiple attached networks.

The cluster processing done in the nodes for outbound messages replaces the cluster processing done for outbound messages in the gateways in the first preferred embodiment, previously described in FIG. 6. In this alternate embodiment, boxes 620, 625, and 630 in FIG. 6 are not necessary. In this embodiment, gateways receive outbound messages from nodes which have a cluster address in the MM header source address field (rather than the address of the node originating the node). This is not a problem, since only the destination address is needed by the gateway to correctly forward the outbound message via one of the attached networks.

This alternative embodiment allows an external host to communicate with a specific node in the cluster if the node address is known. The message switch mechanism is by-passed because the NO path from box 515 of FIG. 5 will be taken. This embodiment can be used by a utility management function running outside the cluster that could get usage statistics from a particular node or start or stop application processes on a particular node.

To further illustrate the function of the present invention the following non limiting examples are presented.

NFS and MOUNT Servers: Overview

Network File System (NFS) is a software package developed by Sun Microsystems which allows host machines to access filesystems or files from other machines on the network. The protocol begins with a MOUNT request to the machine (called the SERVER) containing the desired filesystem. The requesting machine (the CLIENT) receives a filehandle (FH) as the result of a successful MOUNT request. The CLIENT delivers a FH as part of subsequent NFS requests, and may receive other FH's and/or data as a result of successful NFS requests.

A CLIENT can MOUNT from a plurality of SERVERS at any given time. Using the current invention, a physical plurality of servers, i.e., nodes of the cluster, can be used by CLIENTS outside the cluster as if the plurality were a single SERVER. Alternately, the plurality of nodes of the cluster can be considered a single distributed NFS SERVER, thereby obtaining the benefits of load distribution, and also continued provision of service in the event of a failure of one server, if the version of NFS which provides that capability (i.e., HA/NFS, an IBM product) is executed in the cluster.

EXAMPLE 1

MOUNT server

MOUNT is a part of the Network File System (NFS) suite of services. When it starts up, it obtains a privileged port and registers itself, i.e., its program number and version, and port number, with PORTMAPPER, a service whose function it is to provide to external clients the port on which a service, in this example MOUNT, receives messages.

At each node of the cluster on which MOUNT is running, the above sequence occurs. In general, MOUNT's port at each node of the cluster will be different from MOUNT's port at other cluster nodes, including the gateway. Clients of MOUNT outside the cluster will receive from PORTMAPPER at the gateway MOUNT's port in the gateway. But, as part of this embodiment, MOUNT's port at each cluster node on which it is running is communicated to and remembered by the message switch in the gateway.

Once the client running at the host receives the MOUNT port number of the node, the client at the host sends another (incoming) message to the cluster which accesses the MOUNT function. This is treated as an incoming message as described below. When a MOUNT request succeeds, the client on the host receives from the server a filehandle. The filehandle is a 32 byte token, opaque to the client, which is used for subsequent access to the mounted directory.

Figure 7:
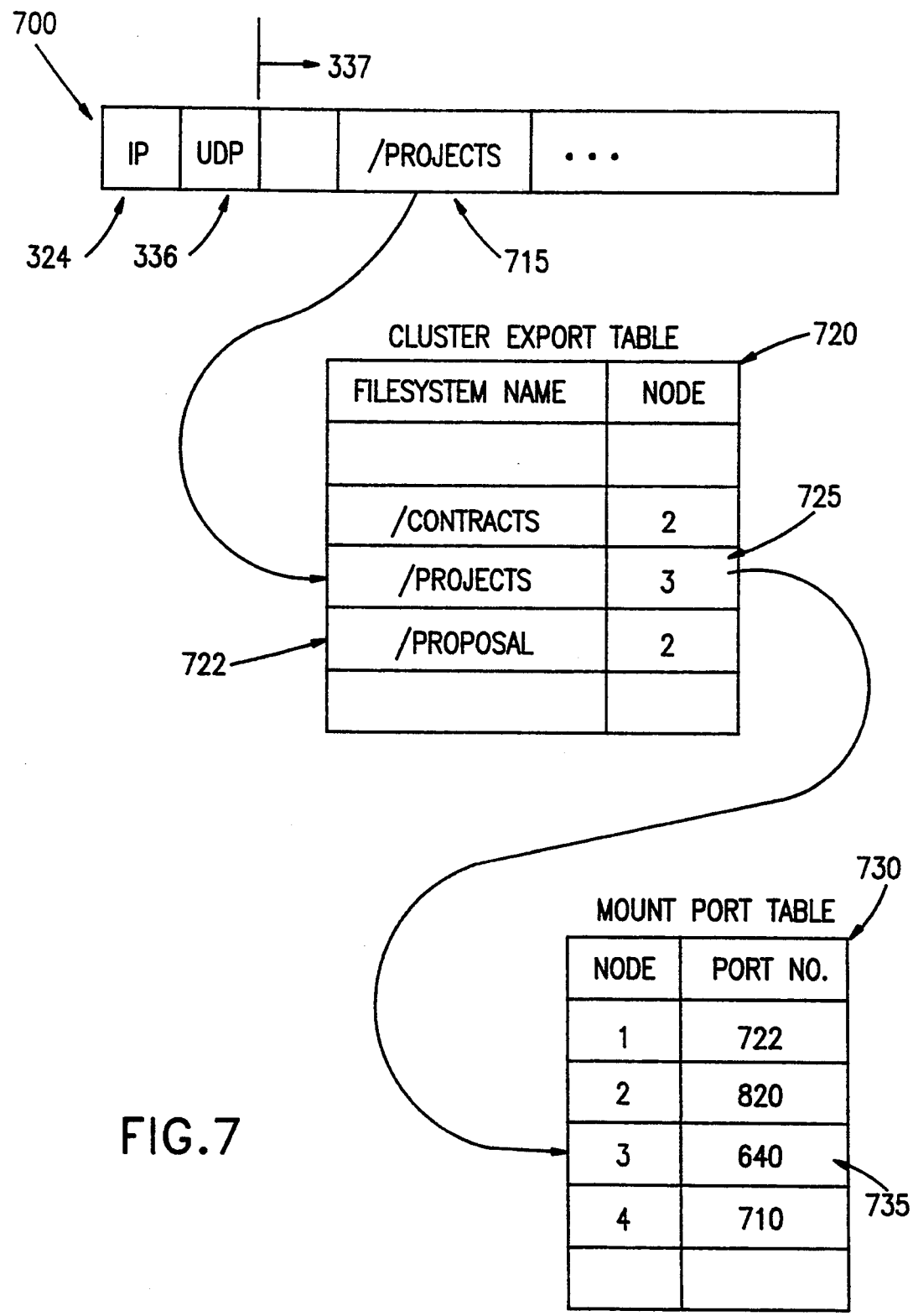
FIG. 7 shows data structures used by a function in the message switch which processes a MOUNT request.

FIG. 7 shows a MOUNT MM message and two data structures which exist as part of the MOUNT function support in the cluster, i.e., a function which would appear in the message switch table 410 column 418 in FIG. 4.

FIG. 7 shows the structure of an incoming MOUNT request 700. Since MOUNT requests are IP/UDP type messages, the MM header 324 (see also FIG. 3) is an IP header and the datagram header 336 is a UDP header. In the datagram data area 337, the MOUNT request contains a character string which represents the filename (or filesystem name) 715 which is to be MOUNTED. This filename 715 is read by the MOUNT function (f_MOUNT) in the message switch table 410 and is used to access node information 725 from a cluster export table 720 present in the f_MOUNT function. The node information 725 in the Cluster Export Table 720 gives the node number of the node on which the file identified by the filename 715 resides. This filename 715 (the filename in FIG. 7 is /Projects) can represent an individual file or a directory with a number of files. The node information (number) 725 is then used to access a Mount Port Table 730 in the f_MOUNT function. The Mount Port Table 730 uniquely matches the node number of a node to the port number 735 being used by the MOUNT program running on that node.

Figure 8:
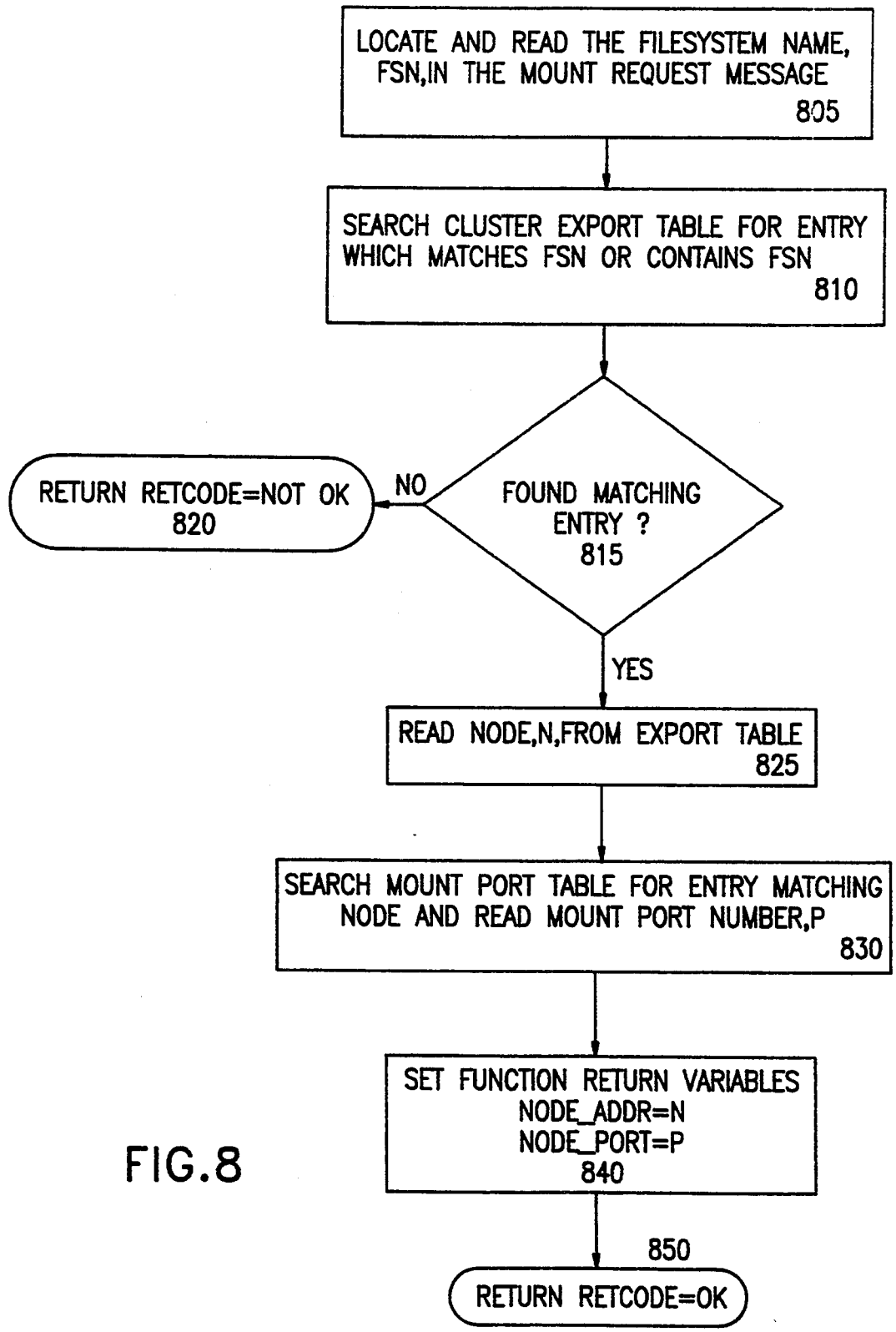
FIG. 8 is a flow chart of the computer program performed by the function in the message switch which processes a MOUNT request.

FIG. 8 is a flowchart showing how the f_MOUNT function in the message switch processes an incoming MOUNT request message. This function is performed in general terms in box 565 of FIG. 5. Note that an outgoing MOUNT request is not covered because it is handled the same way any other outgoing message is handled as previously described. See FIG. 6.

In box 805, the f_MOUNT function locates and reads the filesystem name (FSN) 715 in the incoming MOUNT request 700. Next, in box 810, the Cluster Export Table 720 is searched for an entry 722 which matches the FSN or contains the FSN. Decision block 815 determines if a match has been found between the FSN and an entry 722 in the Cluster Export Table 720. If no entry matches, the f_MOUNT function returns a "ret_code" of not OK 820. This ret_code indicates that there is an error, i.e., that the requested FSN is not available for mounting from the cluster. In these cases, the gateway tries to process the MOUNT request. If a match is found in the Cluster Export Table 720, the corresponding node number, N, 725 is read (box 825). This node number is used to search the Mount Port Table 730 (box 830) for an entry matching the node number. That mount port number, P, 735 is read from the table. In box 840, the f_MOUNT function returns a NODE_ADDR variable equal to the matched node number, N, and a NODE_PORT variable equal to the mount port number, P. A ret_code of OK is also returned (box 850).

The message switch forwards the mount request to node N, where it is processed by the mount server on that node. If successful, the mount server creates and returns to the requester a filehandle (FH) for the file specified in the mount request. As part of the support for the NFS message switch routing function, all filehandles generated within the cluster, contain in a previously unused field, the node number, N, of the node on which the associated file resides.

EXAMPLE 2

NFS server

An NFS request is an IP/UDP type request which provides a filehandle (obtained using a MOUNT request or from a previous NFS request) to access a file represented or in a directory represented by the filehandle.

Figure 9A:
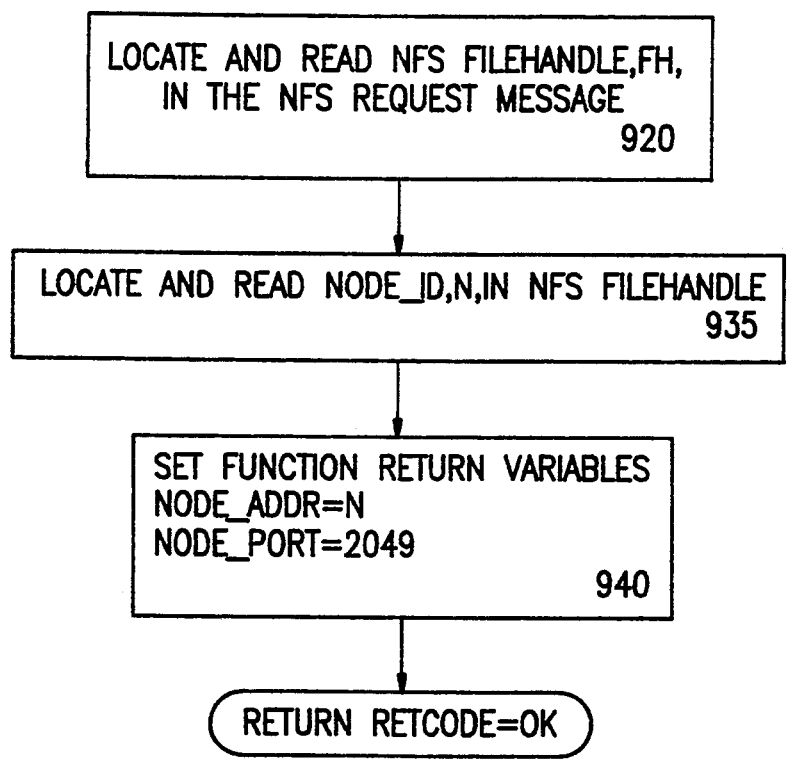
FIGS. 9a–9b show data structures and a flow chart used by a function in the message switch which processes NFS requests.
Figure 9B:
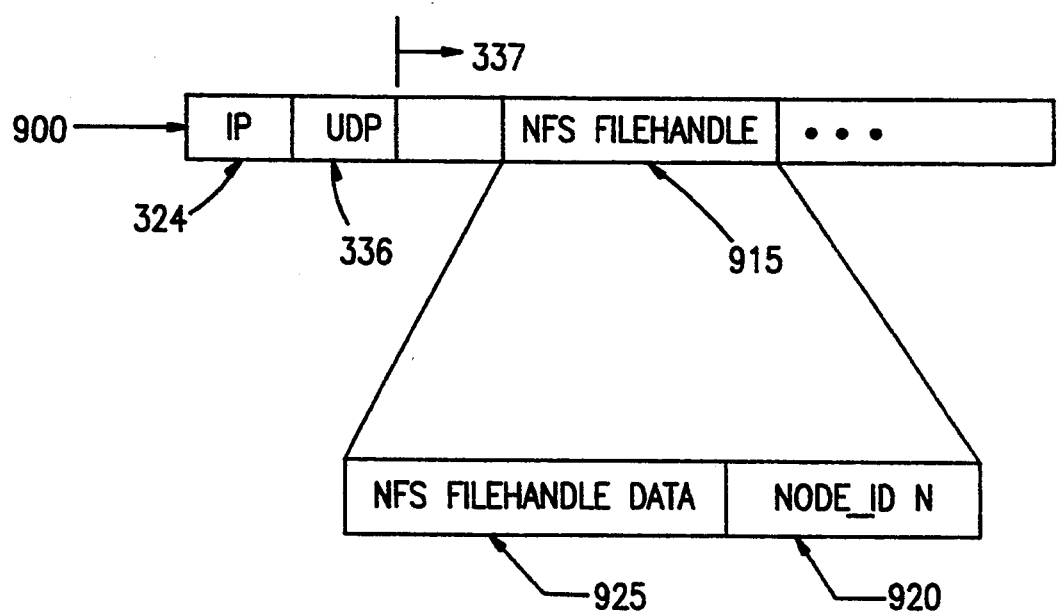

FIG. 9 shows the structure of a NFS request 900 and a flow chart showing how the f_NFS, the NFS function, processes a NFS request.

As with any IP/UDP request, the MM datagram has an IP header 324 and an UDP header 336. The NFS datagram data area 337 contains a filehandle 915 which has many fields. One of these fields, normally unused, in the present invention contains the cluster node address, N, of the file being accessed. Other fields 925 contain NFS file handle data.

The NFS function, f_NFS, first locates and reads the NFS file handle (FH) 915 in the NFS request (box 930). Next, in box 935, the NFS function locates and reads the node number, N, in the NFS filehandle, which was inserted by the preferred embodiment MOUNT request (described above). In box 940, the return variable NODE_ADDR is set equal to N and the variable NODE_PORT is set equal to 2049. The value of 2049 is a well known number for NFS requests and is the same value used for all nodes in the cluster. For incoming NFS requests, the process shown in FIG. 9 is performed as part of the process shown in box 565 in FIG. 5. Outgoing NFS requests are handled as all outgoing messages as explained above. See FIG. 6.

EXAMPLE 3

TCP-Based Servers

Figure 10:
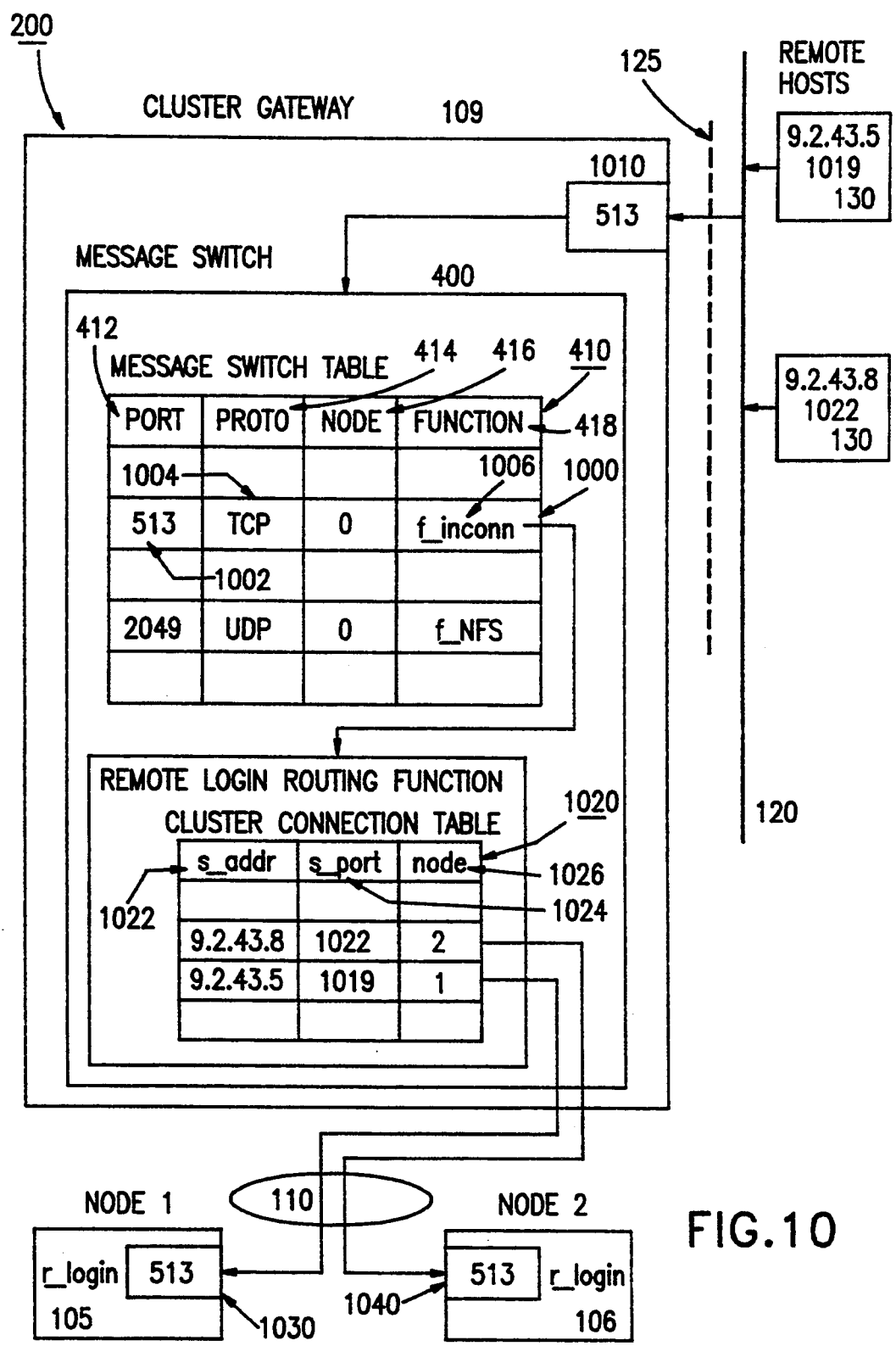
FIG. 10 shows data structures used by functions in the message switch which process TCP connection service requests, in particular rlogin.

RLOGIN, REXEC, RSH, and TELNET are examples of TCP connection based services associated with well known port numbers which are listed in a known IP file called /etc/services. Using these protocols, clients running on external hosts establish connections with the well known port associated with the service that they want. Except for the value of the well known port number, the treatment of these and other similar protocols is the same so this discussion is limited to describing RLOGIN whose well known port number is 513. FIG. 10 illustrates the data structures and control flow for RLOGIN for a cluster with a single gateway.

On each node of the cluster, including the gateway, the normal rlogin daemon is started. A daemon in the UNIX context is a program which provides essential services for users of its function, and which is normally executing and available to its users whenever its host system is available. Each daemon "listens" on port 513, waiting to "accept" connection requests from rlogin clients running on hosts outside the cluster. While there are multiple occurrences of port 513 and the associated rlogin daemon within the cluster, when viewed from the internet, the cluster appears as a single host with a single rlogin daemon. This is accomplished because the only port 513 seen outside the cluster is that of the cluster gateway.

A request for rlogin to the cluster is addressed to the gateway and arrives at the gateway with destination port number 513 and protocol field value TCP, i.e., 6. In the message switch, port number 513 and protocol TCP are matched with function f_inconn 1006, which is invoked. A flag indicator in the message specifies that this is a request for a new connection. The f_inconn function finds the source address (s_addr) 1022 and the source port number (s_port) 1024 in the incoming message, and compares this pair of values against entries in a Cluster Connection Table 1020. If it finds no matching entry (the normal case), it creates one, and associates with it a node 1026 according to a load distribution, i.e., balancing, algorithm. (One preferred algorithm is round-robin but any other load balancing algorithm know in the art can be used.) The message is forwarded to the chosen node where the connection is established by the rlogin daemon running on that node. If there is an existing matching entry in the Cluster Connection Table 1020, the message is forwarded to the associated node. This is likely an error, and the rlogin daemon on the node will generate the appropriate error response.

Subsequent messages associated with an established connection are also processed by the connection manager, f_inconn. s_addr and s_port are used to find the matching entry in the Cluster Connection Table for the connection, and the messages are forwarded to the node associated with the connection.

If a message does not contain a flag indicator for a request to establish a connection and a matching entry in the Cluster Connection Table is not found, the message is discarded.

An incoming message may contain flag indicators which specify that the sending host machine intends to terminate the connection. When this occurs, the entry for the connection in the Cluster Connection Table is removed, and the message is then forwarded to the node associated with the connection, which performs protocol-level processing associated with terminating the connection.

It will be appreciated that the examples given above of this invention are for illustrative purposes and do not limit the scope of the invention. One skilled in the art given this disclosure could design an encapsulated cluster which would appear as a single image computer to outside hosts on a network for a variety of types of port type incoming and outgoing messages. For example:

As shown above, the encapsulated cluster can be accessed by other hosts on a network as if it were a single machine on the network. Hosts not part of the cluster operate in their normal network environment without modification while accessing services and data from the encapsulated cluster.

As shown above, services associated with a protocol port (NFS, MOUNT, RLOGIN) can be distributed over multiple nodes of the cluster, and the message switch can be used to distribute the workload among the multiple instances of the service.

Furthermore, the message switch facilitates the use of the cluster for high availability applications. One can run two instances of an application, a primary and a backup, on different nodes of the cluster, where the backup is capable of taking over for the primary if it fails. If failure of the primary occurs, the message switch can be used to direct messages that would have gone to the primary, instead to the node running the backup, by changing the message switch table entries for the ports used by the application. Hosts outside the cluster continue to communicate with the application, using the same address and ports as if the failure did not occur.

Similarly, the single system image provided by the encapsulated cluster via the message switch supports the capability for applications which are able to communicate between separate instances of themselves to transparently take over the workload of a failed instance, if these multiple instances are executing in encapsulated cluster nodes. If surviving instances are able to continue work that had been executing in a failed node, the message switch can be configured to direct messages which would have been sent to the failed node, instead to the node taking over the failed node's workload. To hosts outside the cluster, the application continues as if the failure did not occur.

We claim:

1. A method for routing incoming messages across a boundary of a cluster of computer nodes, the cluster connected to one or more networks, comprising the steps of:
    reading a software communication protocol number in a message header of the message to recognize an incoming message as a software communication protocol port type message, the message having a destination address of a gateway node within the cluster of computer nodes;
    locating and reading a software communication protocol port number in the message header of the software communication protocol port type message;
    matching both the software communication protocol port number and the software communication protocol number to an entry in a message switch memory, the matched software communication protocol port number entry being associated with a software communication protocol port specific function which selects a routing destination for the message from a plurality of possible destinations, the destination being a computer node in the cluster; and
    routing the message to the computer node destination.

2. A method of routing incoming messages across the boundary of a cluster of computers, as in claim 1, where the function modifies the destination address in the message header to that of the address of the destination node selected by the function.

3. A method of routing incoming messages across a boundary of a cluster of computers, as in claim 2, where the function also modifies a destination port number in the message header to that of a port number on the destination node.

4. A method of routing incoming messages across the boundary of a cluster of computers, as in claim 1, where there is no matched entry in the message switch memory and the destination node is computed by a routing algorithm.

5. A method of routing incoming messages across the boundary of a cluster of computers, as in claim 4, where the algorithm determines the destination node address by using the destination port number in the message header.

6. A method of routing incoming messages across the boundary of a cluster of computers, as in claim 1, where messages are sent to the selected destination node without changing the destination address field in the message header, and the destination node accepts any message having a destination address recognized by a cluster gateway message switch.

7. A method of routing incoming messages across the boundary of a cluster of computers, as in claim 1, where the message which is to be routed to a failed node is routed to an operating node in the cluster.

8. A method for routing incoming messages across a boundary of a cluster of computer nodes, the cluster connected to one or more networks, comprising the steps of:
reading a software communication protocol number in an IP message header to recognize the incoming message as a software communication protocol port type message, the IP message header being on a message with a destination address of a gateway within the cluster of computer nodes;
locating and reading a software communication protocol port number in the message header of the software communication protocol port type message;
matching both the software communication protocol port number and the software communication protocol number to an entry in a message switch memory, the matched software communication protocol port number entry being associated with a port specific function which selects a routing destination for the message from a plurality of possible destinations, the destination being a computer node in the cluster; and
routing the message to the computer node destination.

9. A method of routing incoming messages across the boundary of a cluster of computers, as in claim 8, where the function modifies the destination address in the message header to that of the address of the destination node selected by the function.

10. A method of routing incoming messages across a boundary of a cluster of computers, as in claim 9, where the function also modifies the destination port number in the IP message header to that of a port number on the destination node.

11. A method of routing incoming messages across the boundary of a cluster of computers, as in claim 8, where there is no matched entry in the message switch memory, and the destination is computed by a routing algorithm.

12. A method of routing incoming messages across the boundary of a cluster of computers, as in claim 11, where the algorithm determines the destination node address by using the destination port number in the message header.

13. A method of routing incoming messages across a boundary of a cluster of computers, as in claim 8, where the protocol number is a UDP identifier.

14. A method of routing incoming messages across a boundary of a cluster of computers, as in claim 13, where the UDP protocol number is 17.

15. A method of routing incoming messages across a boundary of a cluster of computers, as in claim 8, where there is more than one destination node in the cluster using a common port number.

16. A method of routing incoming messages across the boundary of a cluster of computers, as in claim 15, where the common port number is the port number associated with NFS.

17. A method of routing incoming messages across the boundary of a cluster of computers, as in claim 15, where the common port number is the port number associated with RLOGIN.

18. A method of routing incoming messages across a boundary of a cluster of computers, as in claim 8, where the message is a MOUNT type request for a filehandle and part of the message is a data field which contains a filesystem name that was requested by the source host of the MOUNT request.

19. A method of routing incoming messages across a boundary of a cluster of computers, as in claim 18, where the selected node returns the filehandle which includes a destination node identifier used by a later NFS request.

20. A method of routing incoming messages across a boundary of a cluster of computers, as in claim 8, where the message is a NFS type request and the message data field contains a filehandle.

21. A method of routing incoming messages across a boundary of a cluster of computers, as in claim 20, where the filehandle includes a destination node identifier.

22. A method of routing incoming messages across a boundary of a cluster of computers, as in claim 8, where the protocol number is a TCP identifier.

23. A method of routing incoming messages across a boundary of a cluster of computers, as in claim 22, where the TCP protocol number is 6.

24. A method of routing incoming messages across a boundary of a cluster of computers, as in claim 22, where the function is a connection manager which routes the message to a destination computer node in the cluster based on the values of a source port number and a source IP address number.

25. A method of routing incoming messages across a boundary of a cluster of computers, as in claim 24, where the destination computer node for new connections is determined by algorithm.

26. A method of routing incoming messages across a boundary of a cluster of computers, as in claim 25, where the algorithm determines the destination computer node in a way to balance a load among nodes in the cluster.

27. A method of routing incoming messages across a boundary of a cluster of computer, as in claim 26, where the algorithm is a round-robin.

28. A method of routing incoming messages across the boundary of a cluster of computers, as in claim 25, where the algorithm ensures that, for each external source host, all TCP messages from that source host are routed to the same destination node.

29. A method of routing incoming messages across the boundary of a cluster of computers, as in claim 8, where messages are sent to the selected destination node without changing the destination IP address field in the message header, and the destination node accepts any message having a destination IP address recognized by a cluster gateway message switch.

30. A method of routing incoming messages, as in claim 12, where the software communication protocol number in the IP message header is a TCP protocol number and the software communication protocol port number is a TCP port number.

31. A method of routing an incoming TCP connection based message across a boundary of a cluster of computers, as in claim 30, where the message is a RLOGIN type.

32. A method of routing an incoming TCP connection based message across a boundary of a cluster of computers, as in claim 30, where the message is a REEXEC type.

33. A method of routing an incoming TCP connection based message across a boundary of a cluster of computers, as in claim 30, where the message is a RSH type.

34. A method of routing an incoming TCP connection based message across a boundary of a cluster of computers, as in claim 30, where the message is a TELNET type.

35. An apparatus for routing messages across a boundary of a cluster of computers on a network, comprising:

two or more computers connected together by an interconnect in a cluster, each computer being a node of the cluster;

one or more computer nodes in the cluster being a gateway node to the cluster, the gateway node being connected to the network at a cluster boundary and having a software communication protocol address on the network, the protocol address being the address of the gateway and the cluster;

a message switch, residing in the gateway node which matches both a message software communication protocol number and destination software communication protocol port number of the message coming into the cluster from the network to an entry in a table in the message switch memory; and one or more routing functions, residing in the message switch table, one of the routing functions associated with the matched table entry which is used for directing messages crossing the cluster boundary into the cluster to a destination node within the cluster, the destination node being determined by the message switch using information on the message.

* * * * *